United States Patent [19]
Olsen et al.

[11] Patent Number: 5,771,998
[45] Date of Patent: Jun. 30, 1998

[54] FORCE OR TORQUE TRANSMITTING APPARATUS WITH TWO HYDRAULIC CLUTCHES

[75] Inventors: Steven Olsen, Bühl; Rudolf Hönemann, Ottersweier, both of Germany; Wendy Boman, Wooster, Ohio

[73] Assignee: LuK Lamellen und Kupplungsbau GmbH, Bühl, Germany

[21] Appl. No.: 465,817

[22] Filed: Jun. 6, 1995

Related U.S. Application Data

[63] Continuation-in-part of Ser. No. 420,238, Apr. 11, 1995.

[30] Foreign Application Priority Data

Apr. 26, 1994 [DE] Germany .......................... 44 14 521.7
Apr. 26, 1995 [DE] Germany .......................... 195 15 302.2

[51] Int. Cl.[6] ................................................... F16D 33/00
[52] U.S. Cl. ..................... 192/3.29; 192/3.3; 192/103 F
[58] Field of Search ................................... 192/3.29, 3.3, 192/3.33, 103 F

[56] References Cited

U.S. PATENT DOCUMENTS 4,090,417  5/1978  Burcz et al. .......................... 192/3.3 X
4,194,604  3/1980  Nichols et al. .......................... 192/3.3

*Primary Examiner*—Andrea L. Pitts
*Attorney, Agent, or Firm*—Darby & Darby

[57] ABSTRACT

A force or torque transmitting apparatus which transmits torque from the output element of a prime mover to the input element of a transmission or another driven unit in a motor vehicle by way of a hydrokinetic torque converter and/or by way of a lockup clutch. When the vehicle embodying the apparatus is coasting, the housing of the torque converter is engaged only by the friction lining on the axially movable piston of the lockup clutch when the latter is engaged, either entirely or with slip. Thus, it is not necessary to provide one or more thrust bearings between the piston of the lockup clutch and the housing of the torque converter.

16 Claims, 7 Drawing Sheets

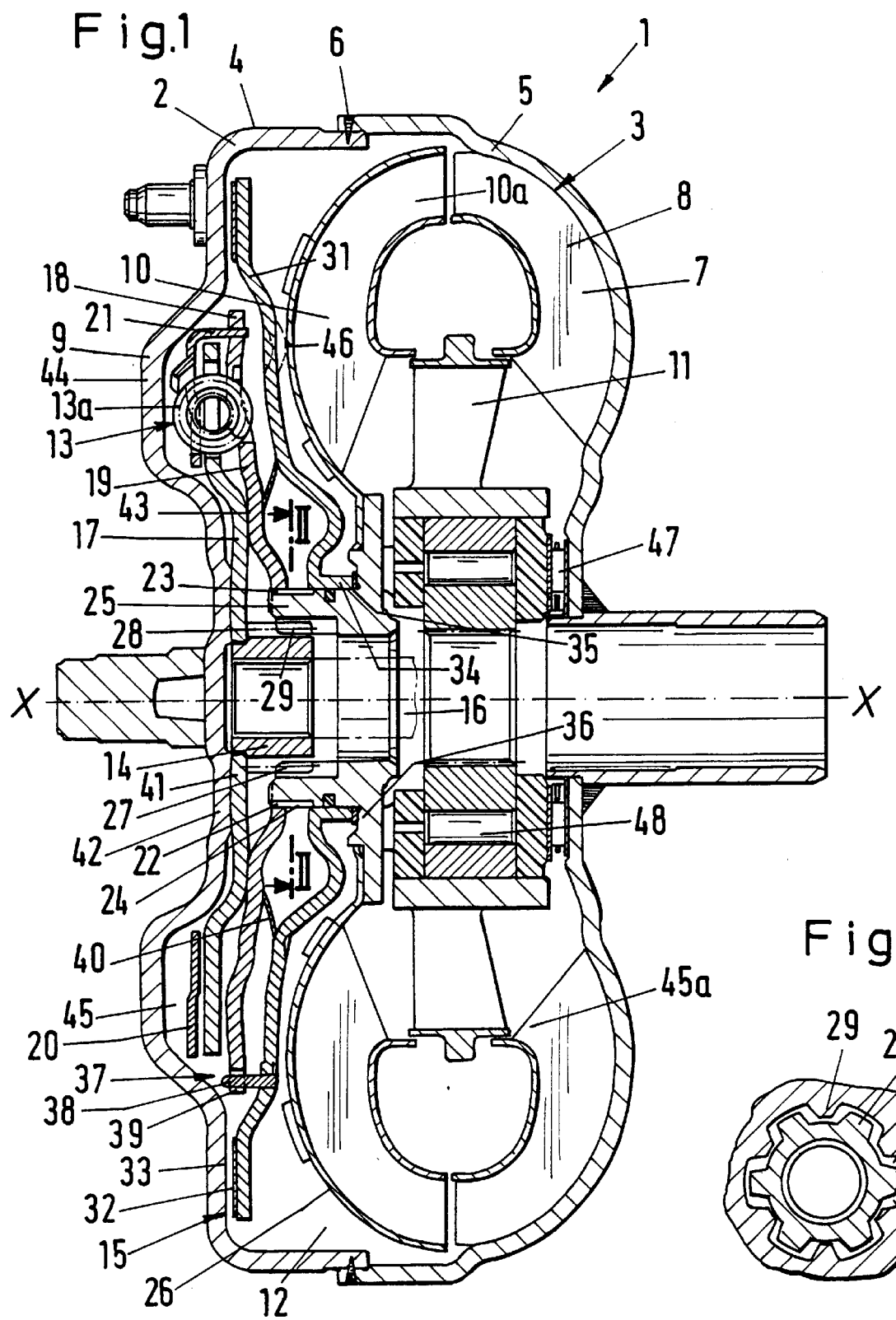

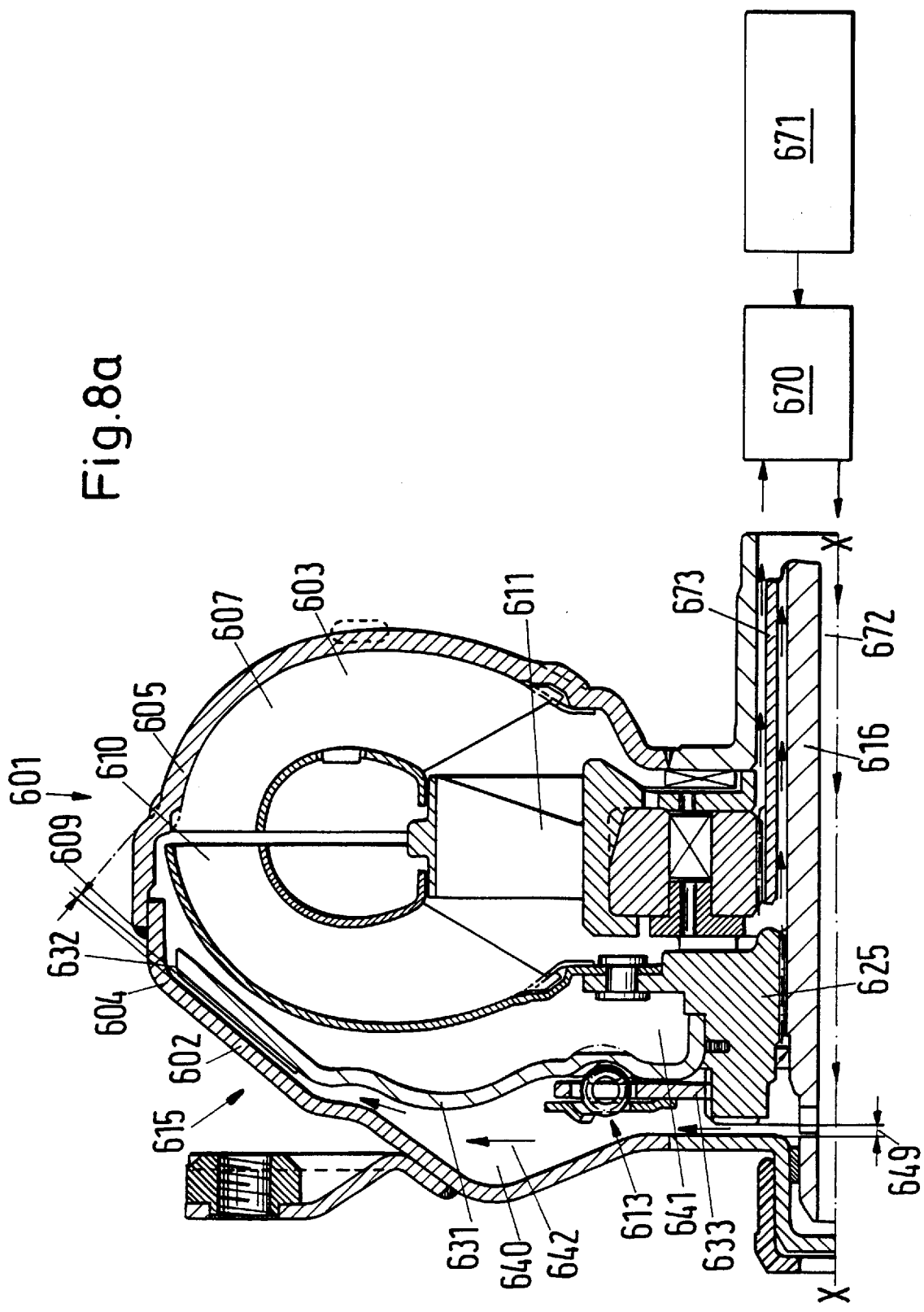

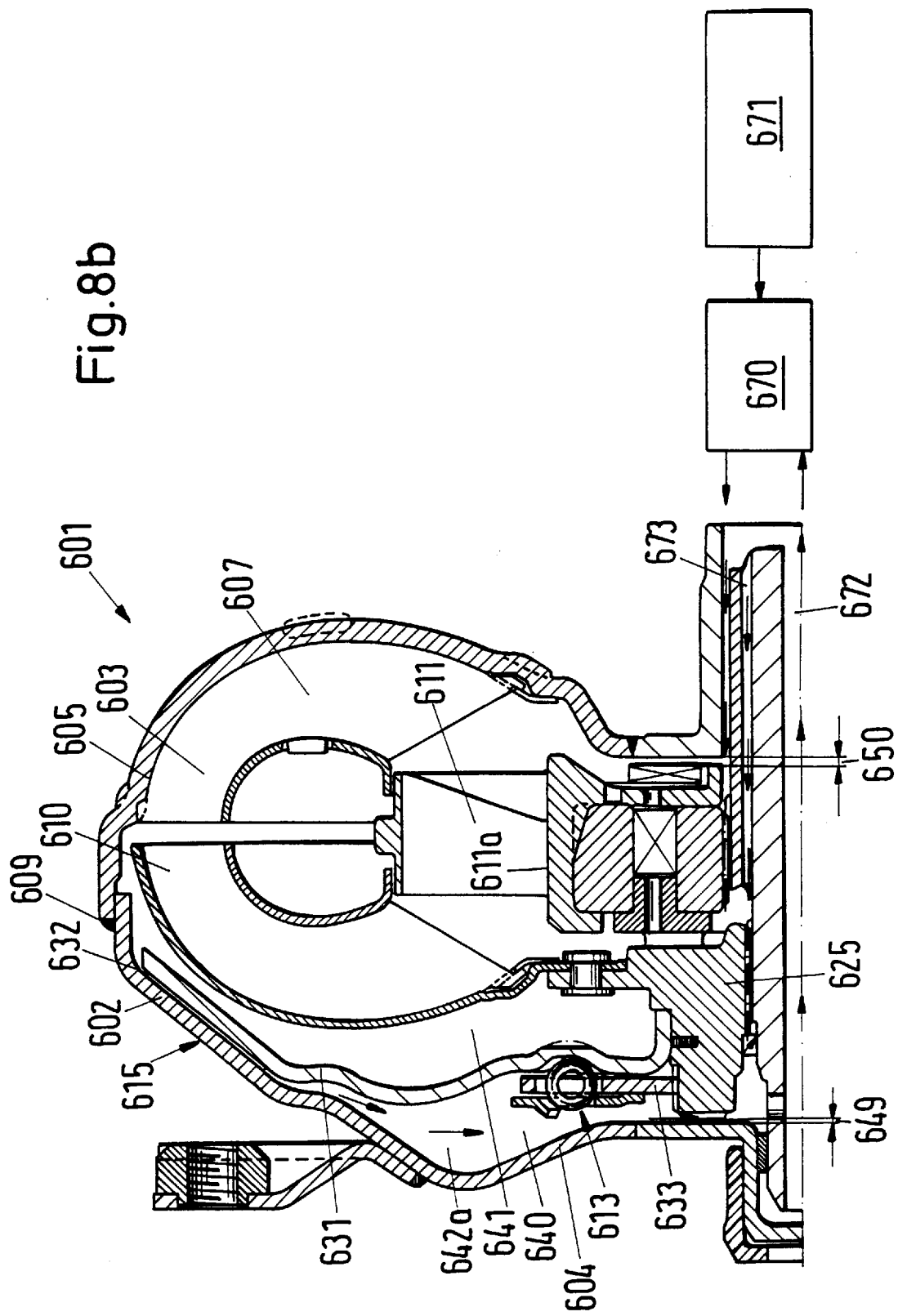

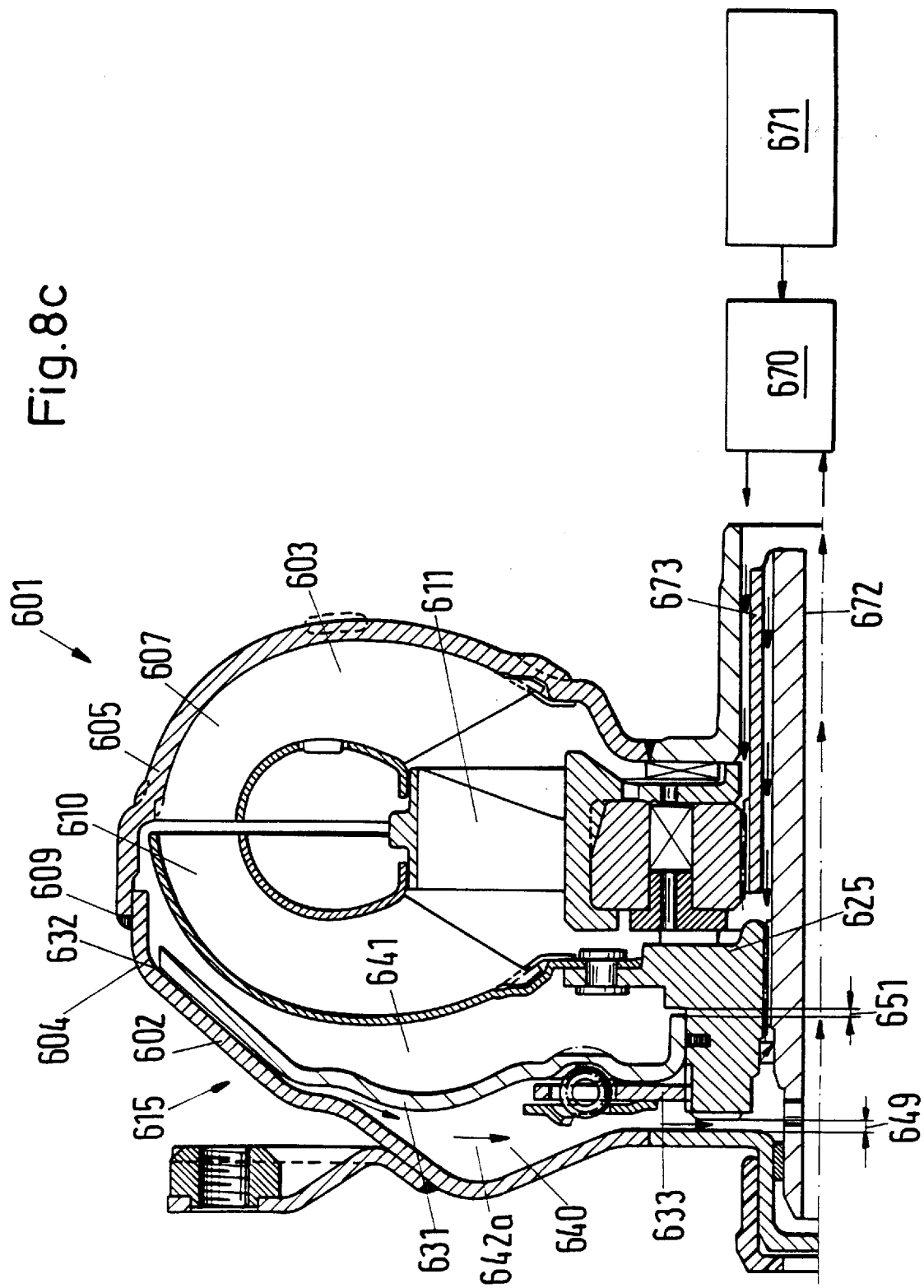

FORCE OR TORQUE TRANSMITTING APPARATUS WITH TWO HYDRAULIC CLUTCHES

CROSS-REFERENCE TO RELATED CASE

This is a continuation-in-part of the commonly owned copending patent application Ser. No. 08/420,238 filed Apr. 11, 1995 for "Torque transmitting apparatus with hydrokinetic torque converter".

BACKGROUND OF THE INVENTION

The invention relates to improvements in apparatus for transmitting torque, and more particularly to torque transmitting apparatus which utilize fluid-operated clutches, such as hydrokinetic torque converters.

A hydrokinetic torque converter comprises a rotary housing which is connectable with the output component of a prime mover (e.g., with the camshaft or crankshaft of a combustion engine in a motor vehicle), at least one pump which is driven by the housing, and a turbine which is installed in the housing and receives torque from the pump to transmit torque to an output element, e.g., to a hub which drives the input element of a driven unit such as the input shaft of a variable-speed transmission in the power train between the torque converter and one or more wheels of a motor vehicle. The torque converter can further comprise at least one stator which is installed in the housing between the at least one pump and the turbine. It is also known to provide such torque transmitting apparatus with at least one damper which is installed in a power flow between the housing and the output element of the torque converter. The damper or dampers serve to absorb vibrations of torque which is being transmitted from the housing to the output element of the torque converter.

Torque transmitting apparatus of the above outlined character are disclosed, for example, in published German patent application No. 42 13 341, in German patent application No. 43 33 562.4 and in U.S. Pat. No. 5,103,947. The disclosure of the U.S. Pat. No. 5,103,947, is incorporated herein by reference.

OBJECTS OF THE INVENTION

An object of the invention is to provide a torque transmitting apparatus which is at least as versatile and reliable as heretofore known torque transmitting apparatus but can be produced at a much lower cost.

Another object of the invention is to provide an apparatus which can be assembled, either entirely or to a considerable extent, at the manufacturing plant so that it can be installed between a prime mover and one or more driven units in a surprisingly simple and time saving manner.

A further object of the invention is to provide an apparatus with one or more dampers the damping action of which is superior to that of damper or dampers in conventional torque transmitting apparatus.

An additional object of the invention is to provide an apparatus which can transmit large torques, at least when the torque is being transmitted by the torque converter, without necessitating the utilization of one or more complex, bulky and expensive dampers.

Still another object of the invention is to provide a torque transmitting apparatus the useful life of which exceeds that of heretofore known torque transmitting apparatus which employ a fluid-operated clutch and one or more dampers.

A further object of the invention is to provide a torque transmitting apparatus which is subject to less pronounced wear than heretofore known torque transmitting apparatus.

Another object of the invention is to provide a novel and improved torque transmitting connection between the turbine and the output element of the fluid-operated clutch in the above outlined torque transmitting apparatus.

An additional object of the invention is to provide a novel and improved method of transmitting torque from the rotary output component of a prime mover to the rotary input element(s) of one or more driven units along any one of a plurality of discrete paths.

SUMMARY OF THE INVENTION

One feature of the present invention resides in the provision of a torque transmitting apparatus which comprises a fluid-operated clutch (such as a hydrokinetic torque converter) including a housing connectable with a rotary output component of a prime mover (such as a combustion engine in a motor vehicle), at least one pump receiving torque from the housing, a rotary output element which is connectable with a rotary input element of a driven unit (e.g., a variable-speed transmission in the power train between the output element of the fluid-operated clutch and one or more wheels of a vehicle), and a turbine which is interposed between the at least one pump and the output element. The apparatus further comprises at least one torsional vibrations absorbing torque transmitting damper which is disposed in a power flow between the turbine of the fluid-operated clutch and the output element and includes an input member which is rotatable with the turbine, an output member connected with the output element and being rotatable relative to the input member, and energy storing means (e.g., a set of coil springs) arranged to oppose rotation of the input and output members relative to each other. The torque transmitting apparatus still further comprises a form-locking connection which is provided between and permits at least limited angular movements of the turbine and the output element of the fluid-operated clutch relative to each other. The clutch can further comprise at least one stator which is disposed between the at least one pump and the turbine.

The form-locking connection is or can be designed in such a way that it includes means for limiting the magnitude of torque which can be transmitted by the at least one damper. Such connection can include means for transmitting torque between the turbine and the output element of the fluid-operated clutch in parallel with the transmission of torque between the turbine and the output element by the at least one damper.

The improved apparatus can further comprise a lockup clutch or bypass clutch which is connected in series with the at least one damper. It is often preferred to install the lockup clutch in the housing of the fluid-operated clutch upstream of the at least one damper (as seen in the direction of transmission of torque from the housing to the output element of the fluid-operated clutch).

The form-locking connection can be provided between a radially inner portion of the turbine and the output element of the fluid-operated clutch, and such radially inner portion of the turbine can include or constitute a hub.

The form-locking connection can comprise external teeth provided on the turbine or on the output element of the fluid-operated clutch and internal teeth mating with the external teeth and provided on the output element or on the turbine. For example, the internal teeth can be provided on the aforementioned radially inner portion (such as a hub) of the turbine. The internal teeth can extend into a central passage which is provided in the radially inner portion of the turbine to (directly or indirectly) receive the input element of the driven unit. The length of such internal teeth can match or can be less than the axial length of the passage in the radially inner portion of the turbine.

The external teeth (e.g., external teeth provided on the output element of the fluid-operated clutch) can engage the internal teeth (e.g., the internal teeth of the radially inner portion of the turbine) with a predetermined play in the circumferential direction of the turbine. Such play determines the extent of angular movability of the turbine and the output element of the fluid-operated clutch relative to each other.

The input element of the driven unit can comprise or constitute a shaft which is surrounded by a hub forming part of or constituting the output element of the fluid-operated clutch. Alternatively, the apparatus can further comprise a hollow shaft which surrounds the input element of the fluid-operated clutch and is in turn surrounded by and centers the radially inner portion (e.g., a hub) of the turbine.

The output member of the at least one damper can be carried by the output element of the fluid-operated clutch. Such output member can comprise a substantially flange-like part which is rigid with the output element of the fluid-operated clutch.

The input member of the at least one damper can include a substantially disc-shaped or washer-like portion which is connected to the turbine (such as to the aforementioned hub forming part of or constituting the radially inner portion of the turbine) so that the hub can transmit torque to the substantially disc-shaped or washer-like portion or vice versa. The substantially disc-shaped or washer-like portion of the input member of the at least one damper can include an internal gear which mates with an external gear of the hub. The input member of the at least one damper can further comprise an annular portion (e.g., a second substantially washer-like or disc-shaped portion) which is rotatable with the first mentioned disc-shaped portion about a common axis and is spaced apart from the first mentioned disc-shaped portion in the direction of such common axis. The aforementioned flange-like portion of the output member of the at least one damper can be disposed at least in part between the substantially disc-shaped or washer-like portions of the input member (as seen in the direction of the common axis of the substantially disc-shaped or washer-like portions).

The substantially disc-shaped or washer-like portions of the input member of the at least one damper can be non-rotatably connected to each other radially outwardly of the substantially flange-like portion of the output member of the at least one damper. The connection is or can be such that the two portions of the input member cannot move relative to each other in the direction of their common axis.

The input and output members of the at least one damper are or can be provided with means (such as windows, holes, recesses or the like) for receiving portions of the energy storing means forming part of the at least one damper.

The input member of the at least one damper can be disposed at a first radial distance and the form-locking connection can be disposed at a lesser second radial distance from the common axis of the turbine, housing and at least one pump of the fluid-operated clutch.

The lockup clutch in the housing of the fluid-operated clutch includes a piston which is movable in the housing in the direction of the aforementioned common axis of the at least one pump, housing and turbine of the fluid-operated clutch. The piston of the lockup clutch can be centered by and can be mounted for movement relative to the hub of the turbine in the direction of the aforementioned common axis.

Such piston can be non-rotatably connected to the turbine. The apparatus can further comprise means for non-rotatably connecting the piston of the lockup clutch to the input member of the at least one damper in such a way that the piston is movable relative to the input member in the direction of the common axis of the turbine and housing or vice versa. Such connecting means can be disposed at a first radial distance and the energy storing means of the at least one damper can be disposed at a lesser second radial distance from the common axis of the turbine and the housing of the fluid-operated clutch. The connecting means can include at least one plug which is provided on the piston or on the input member and at least one socket for the at least one plug provided on (e.g., in) the input member or the piston; the at least one plug preferably extends in at least substantial parallelism with the common axis of the turbine and the housing.

The form-locking connection can be provided between the hub of the turbine and the output element of the fluid-operated clutch. Such form-locking connection can comprise at least one plug provided on the hub or on the output element and extending at least substantially in the direction of the common axis of the turbine and housing into a socket provided in the plug at (e.g., in) the output element of the hub.

The housing of the fluid-operated clutch can comprise a wall which extends at least substantially radially of the common axis of the housing and the turbine and is adjacent the piston of the lockup clutch. The at least one damper is or can be disposed between such wall of the housing and the piston of the lockup clutch (as seen in the direction of the common axis).

Alternatively, the at least one damper can be disposed between the piston of the lockup clutch and the turbine, again as seen in the direction of the common axis of the housing and the turbine of the fluid-operated clutch). The piston is then disposed between the turbine and the aforementioned at least substantially radially extending wall of the housing.

The apparatus can further comprise resilient means (e.g., a diaphragm spring) reacting against the piston of the lockup clutch or against one of the substantially disc-shaped or washer-like portions of the input member of the at least one damper and bearing (in the direction of the common axis of the turbine and housing) against the one substantially disc-shaped or washer-like portion of the piston. For example, the resilient means can be installed to bear against the piston in a direction to move the piston in the direction of the axis of the turbine toward a position in which the lockup clutch is disengaged. The lockup clutch is engaged when the piston contacts and thus receives torque from the housing.

The output member of the at least one damper can act upon the housing in the direction of the common axis of the turbine and housing. Such output member can comprise a radially inner portion which is supported by the housing. The output member can directly engage and can be supported by the housing of the fluid-operated clutch. Such apparatus can comprise means for biasing the output member toward the housing in the direction of the common axis of the housing and the turbine. The biasing means can be interposed between the input member of the at least one damper and the piston of the lockup clutch (as seen in the direction of the aforementioned common axis).

The input member of the at least one damper can abut the output member of such damper in the direction of the common axis of the housing and turbine.

The turbine can abut the piston of the lockup clutch in at least one of several positions of the piston (as seen in the direction of the common axis of the housing and the turbine).

The aforementioned radial wall of the housing and the piston of the lockup clutch can define a fluid-filled compartment, and the pressure of fluid in such compartment can be regulated to change the axial position of the piston. The wall or another portion of the housing can be provided with a friction face (e.g., a friction face of a friction lining affixed to the housing) which is contacted by a radially outer portion of the piston in the (at least partially) engaged condition of the lockup clutch. The radially outer portion of the fluid-filled compartment is sealed from another compartment in the housing when the radially outer portion of the piston (e.g., a friction lining affixed to the piston) contacts the friction face of the housing. The pressure of fluid in the other compartment of the housing can be regulated to determine the magnitude of force with which the radially outer portion of the piston bears against the friction face of the housing in the (at least partially) engaged condition of the lockup clutch.

The input member of the at least one damper can be connected to a shell of the turbine at a location substantially or exactly midway between the radially inner and radially outer portions of such shell. The shell can be connected to the input member by one or more rivets or by resorting to other suitable fastener means.

The radially inner portion of the piston forming part of the lockup clutch can sealingly surround the input element of the driven unit in such a way that the piston is movable relative to the input element in the direction of the common axis of the turbine and the housing. The radially inner portion of the piston can include a sleeve which surrounds the input element. Such radially inner portion of the piston can be provided with a recess (e.g., a circumferentially complete groove) for a sealing element which extends into the recess and sealingly engages the input element of the driven unit. In addition to or in lieu of the aforementioned sealing element, the improved apparatus can be provided with a sealing element which is mounted on (e.g., recessed into an external circumferential groove of) the input element and sealingly engages the radially inner portion of the piston.

If the fluid-operated clutch comprises a stator which is installed between the turbine and the at least one pump (as seen in the direction of the common axis of the housing and the turbine), the radially inner portion of the shell of the turbine can be caused to abut the stator.

It is also possible to design and install the turbine in such a way that its radially inner portion is centered by and is rotatable relative to the output element of the fluid-operated clutch. The energy storing means of the at least one damper is then preferably constructed and installed to oppose rotation of the turbine and the output element relative to each other.

The apparatus can be constructed in such a way that the turbine of the fluid-operated clutch is rotatable jointly with the input member of the at least one damper.

The piston of the lockup clutch can be installed in the housing of the fluid-operated clutch in such a way that it is rotatable with the turbine of the fluid-operated clutch.

Another feature of the invention resides in the provision of a torque transmitting apparatus which comprises a fluid-operated clutch (such as a hydrokinetic torque converter including a housing connectable with a rotary output component of a prime mover, at least one pump receiving torque from the housing, a rotary output element connectable with a rotary input element of a driven unit (e.g., a variable-speed transmission), and a turbine which is interposed between the at least one pump and the output element. The apparatus further comprises at least one torsional vibrations absorbing torque transmitting damper which is disposed in a power flow between the turbine and the output element, and a form-locking connection which is provided between the turbine and the output element and includes means for transmitting torque between the turbine and the output element in parallel with the transmission of torque by the at least one damper.

A further feature of the invention resides in the provision of a torque transmitting apparatus which comprises a fluid-operated clutch (e.g., a hydrokinetic torque converter) including a housing connectable with a rotary output component of a prime mover, at least one pump receiving torque from the housing, a rotary output element connectable with a rotary input element of a driven unit (e.g., a variable-speed transmission between the fluid-operated clutch and one or more wheels of a motor vehicle), and a turbine which is disposed between the at least one pump and the output element and is rotatable with the at least one pump and with the housing about a common axis. The apparatus further comprises at least one torsional vibrations absorbing torque transmitting damper which is disposed in the power flow between the turbine and the output element of the fluid-operated clutch and includes an input member having a substantially washer-like annular portion, a lockup clutch which is provided in the housing in series with the at least one damper and includes a piston movable in the direction of the aforementioned common axis, and resilient means reacting against the piston or against the substantially washer-like annular portion and bearing in the direction of the common axis against the substantially washer-like annular portion or against the piston. The arrangement can be such that the resilient means bears against the piston in a direction to move the piston in the direction of the common axis toward a position in which the lockup clutch is disengaged.

An additional feature of the invention resides in the provision of a torque transmitting apparatus which comprises a fluid-operated clutch (such as a hydrokinetic torque converter) including a housing connectable to a rotary output component of a prime mover, at least one pump receiving torque from the housing, a rotary output element connectable with a rotary input element of a driven unit (such as a variable-speed transmission), and a turbine disposed between the at least one pump and the output element. The torque transmitting apparatus further comprises at least one torsional vibrations absorbing torque transmitting damper which is disposed in a power flow between the turbine and the output element, and a lockup clutch which operates in series with the at least one damper and includes a piston movable between a plurality of positions in the direction of a common axis of the turbine and the housing of the fluid-operated clutch. The turbine abuts the piston in at least one of the plurality of different positions of the piston.

Still another feature of the invention resides in the provision of a torque transmitting apparatus which comprises a fluid-operated clutch (e.g., a hydrokinetic torque converter) including a housing connectable with a rotary output component of a prime mover, at least one pump which receives torque from the housing, a rotary output element connectable with a rotary input element of a driven unit (e.g., a variable-speed transmission), and a turbine which interposed between the at least one pump and the output element, which includes a shell and which is rotatable with the housing about a common axis. The shell of the turbine includes radially inner and radially outer portions and the apparatus further comprises at least one torsional vibrations absorbing torque transmitting damper which is disposed in a power flow between the turbine and the output element and includes an input member connected with the shell substantially or exactly midway between the radially inner and the radially outer portions of the shell.

An additional feature of the invention resides in the provision of a torque transmitting apparatus which comprises a fluid-operated clutch (e.g., a hydrokinetic torque converter) including a housing connectable with a rotary output component of a prime mover, at least one pump receiving torque from the housing, a rotary output element connectable with a rotary input element of a driven unit (e.g., a variable-speed transmission), and a turbine which is interposed between and is rotatable with the at least one pump and the output element about a common axis. The torque transmitting apparatus further comprises at least one torsional vibrations absorbing torque transmitting damper disposed in a power flow between the turbine and the output element of the fluid-operated clutch, and a lockup clutch which is provided in the housing in series with the at least one damper and includes a piston movable in the direction of the common axis. The piston includes a radially inner portion which sealingly and axially movably surrounds the input element of the driven unit.

The radially inner portion of the piston can include or can constitute a sleeve which surrounds the input element of the driven unit.

Furthermore, the radially inner portion of the piston can be provided with a recess (e.g., in the form of a circumferentially complete groove), and the apparatus then further comprises a sealing element (e.g., an O-ring) extending into the recess and engaging the input element of the driven unit. Alternatively, or in addition to such O-ring or an analogous sealing element, the apparatus can comprise a sealing element (such as an O-ring) which is provided on the input element and sealingly engages the radially inner portion of the piston.

A further feature of the invention resides in the provision of a force or torque transmitting apparatus which comprises a first hydraulic clutch (such as a hydrokinetic torque converter) which includes at least one housing rotatable about a predetermined axis and connectable to an output element of a prime mover (e.g., to a camshaft or a crankshaft of a combustion engine in a motor vehicle), at least one pump which receives torque from the housing, and a turbine which is disposed in the housing for rotation about the predetermined axis and is arranged to transmit torque to and to receive torque from a rotary input element (e.g., a shaft of a variable-speed transmission in the power train between the first clutch and one or more wheels of a motor vehicle). The first clutch is operative to coast when the turbine receives torque from the input element and to operate under load when the input element receives torque from the turbine. The force or torque transmitting apparatus further comprises an at least partially engageable and disengageable hydraulic lockup clutch or bypass clutch which is installed between an input member and an output member of the apparatus and includes a piston movable in the direction of the predetermined axis, a first fluid-containing compartment in the housing at one side of the piston, a second fluid-containing compartment at the other side of the piston, and means (e.g., an automatically regulatable valve) for varying the pressure of fluid in the compartments so as to disengage the lockup clutch in response to a rise of fluid pressure in the second compartment above the pressure of fluid in the first compartment and to reengage the lockup clutch in response to a rise of fluid pressure in the first compartment above the pressure of fluid in the second compartment. The turbine and the output member are jointly movable in the direction of the predetermined axis, and the lockup clutch is engageable while the first clutch is coasting. The piston has a friction face (e.g., a friction face provided on a friction lining) and the piston engages the housing in the direction of the predetermined axis only by way of the friction face when the lockup clutch is at least partially engaged while the first clutch is coasting.

The output member of the force or torque transmitting apparatus can include or constitute a hub (radially inner portion) of the turbine forming part of the first clutch.

The first clutch can further include a stator which is disposed between the at least one pump and the turbine, as seen in the direction of the predetermined axis. The housing of the first clutch in such apparatus can include a section (e.g., a section including a wall extending at least substantially radially of the predetermined axis) which is disposed between the piston and the output element (as seen in the direction of the predetermined axis); the piston bears against and transmits to the housing section forces which are being transmitted thereto by the stator and/or by the turbine while the first clutch is coasting.

The radially inner portion (such as the aforementioned hub or output member) preferably abuts the piston in the direction of the predetermined axis at least while the first clutch is coasting.

A normally substantially toroidal radially outer portion of the turbine can abut the piston in the direction of the predetermined axis at least in one of the at least partially engaged and disengaged conditions of the lockup clutch.

The turbine and/or the piston can include one or more abutments which contact the piston or the turbine in at least one of the at least partially engaged and disengaged conditions of the lockup clutch.

The force or torque transmitting apparatus can further comprise at least one damper which acts in the circumferential direction of the housing and is interposed in a torque transmission path between a friction face of the piston and a radially inner portion (such as the aforementioned output member or hub) of the turbine. Expressed in more general terms, the at least one damper (e.g., a damper including means for damping torsional vibrations between the piston and the turbine) can be said to be interposed between the piston of the lockup clutch and the turbine of the first clutch. The damper and the turbine can abut each other in the direction of the predetermined axis in at least one of the at least partially engaged and disengaged conditions of the lockup clutch; for example, the damper can abut the aforementioned hub of the turbine. Alternatively, the aforementioned substantially toroidal portion of the turbine can be caused to abut the damper.

It is also possible to construct the force or torque transmitting apparatus in such a way that the piston abuts the at least one damper in the direction of the predetermined axis in at least one of the at least partially engaged or disengaged conditions of the lockup clutch.

The apparatus can further comprise at least one substantially ring-shaped distancing element which is interposed between the piston and the turbine as seen in the direction of the predetermined axis.

The piston and/or the turbine can be mounted in such a way that the piston has limited freedom of movement relative to the turbine, again as seen in the direction of the predetermined axis.

The novel features which are considered as characteristic of the invention are set forth in particular in the appended claims. The improved force or torque transmitting apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is an axial sectional view of a force or torque transmitting apparatus which embodies one form of the invention and wherein the first fluid-operated clutch includes a hydrokinetic torque converter;

FIG. 2 is a fragmentary transverse sectional view substantially as seen in the direction of arrows from the line II—II in FIG. 1 and shows one presently preferred embodiment of a form-locking connection between the turbine and the output element of the apparatus;

FIG. 8a is a partly schematic fragmentary axial sectional view of a further force or torque transmitting apparatus with the first hydraulic clutch shown in a condition when the vehicle embodying such apparatus is coasting or in the process of pulling a load and with the second hydraulic clutch in disengaged condition;

FIG. 8b shows the structure of FIG. 8a but with the vehicle ready for coasting and with the second clutch shown in the engaged condition; and FIG. 8c shows the structure of FIG. 8a or 8b but with the vehicle ready to pull a load and with the second clutch in at least partially engaged condition.

DESCRIPTION OF PREFERRED EMBODIMENTS

Figure 3:
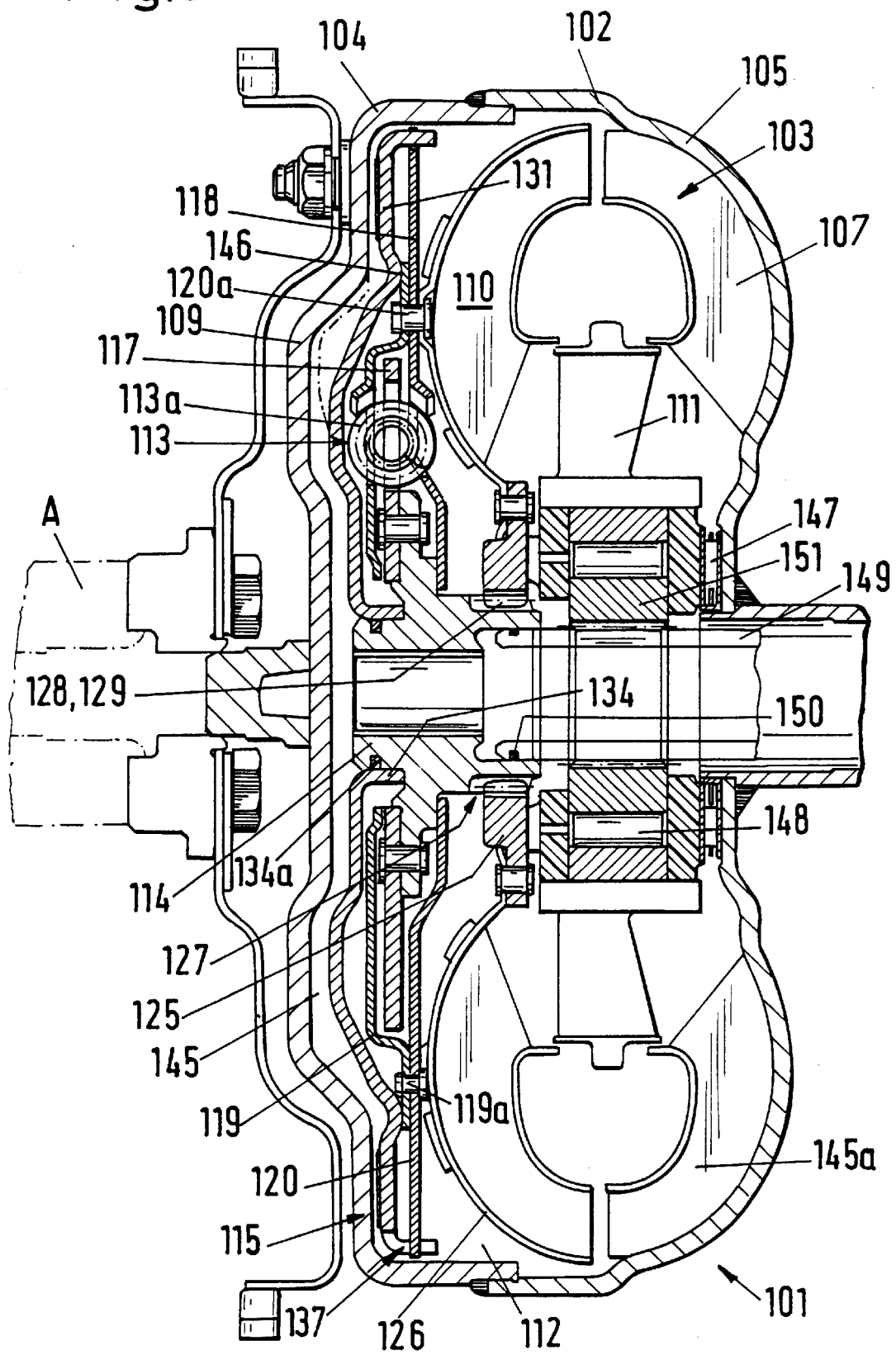
FIG. 3 is an axial sectional view of a force or torque transmitting apparatus constituting a modification of the apparatus shown in FIGS. 1 and 2.

The torque transmitting apparatus 1 which is shown in FIGS. 1 and 2 comprises a fluid-operated clutch 3 which constitutes a hydrokinetic torque converter and comprises a housing 2 connectable to a rotary output component (such as the one shown at A in FIG. 3) of a prime mover. For example, the output component can constitute the camshaft or the crankshaft of a combustion engine in a motor vehicle. The connection between the housing 2 and the output component A of the prime mover can be of the type disclosed, for example, in published European patent application No. 0 066 381 or in published European patent application No. 0 037 059. These publications disclose a torque transmitting member which can be made of metallic sheet material and includes a radially inner portion connected to the output component of the prime mover and a radially outer portion connected to the housing of the hydrokinetic torque converter.

The housing 2 comprises a first substantially cup-shaped section 4 which is connectable to the output component A and a second substantially cup-shaped section 5. A portion of the section 4 is telescoped into the adjacent portion of the section 5, and such portions of the two sections are non-rotatably and sealingly connected to each other by a welded seam 6.

In the torque converter which is shown in FIG. 1, a portion of the section 5 of the housing 2 constitutes the shell of the pump 7 forming part of the torque converter. The vanes 8 of the pump 7 are affixed to the inner side of the housing section 5. The torque converter 3 further comprises a turbine 10 and a stator 11 which is installed between the pump 7 and the turbine 10 as seen in the direction of the common axis X—X of the parts 2, 7 and 10 of the torque converter. The turbine 10 is disposed between the stator 11 and a radially extending wall 9 of the housing section 4, again as seen in the direction of the axis X—X. The turbine 10 and the pump 7 extend radially outwardly beyond the stator 11.

The sections 4 and 5 of the housing 2 define a chamber 12 which is filled with a suitable hydraulic fluid (such as oil) and confines the turbine 10, the stator 11 and the vanes 8 of the pump 7 as well as a damper 13 and a lockup clutch or bypass clutch 15. The damper 13 establishes a torque transmitting connection between the section 4 of the housing 2 and a rotary output element 14 of the torque converter 3 when the lockup clutch 15 is fully or at least partially engaged (i.e., when the clutch 15 transmits torque with or without slip). On the other hand, the damper 13 transmits torque between the turbine 10 and the output element 14 when the lockup clutch 15 is disengaged or operates with at least some slip. The lockup clutch 15 is installed and constructed to operate in series with the damper 13.

The output element 14 of the torque converter 3 comprises a hub having internal teeth which mate with the external teeth of a rotary input element 16, e.g., the input shaft of a driven unit such as a variable-speed transmission in the power train between the torque converter 3 and one or more wheels of a motor vehicle. The turbine 10 can be caused to turn relative to the output element 14 against the opposition of the damper 13 and, in the embodiment of FIG. 1, to a limited extent. However, it is within the purview of the invention to replace the illustrated damper 13 with a damper whose operation is based on the so-called shearing principle of a hydraulic fluid (such as grease); this modified damper merely opposes but cannot prevent rotation of the turbine 10 and the output element 14 relative to each other through any desired angle.

The illustrated damper 13 comprises a substantially flange-like output member 17 which is non-rotatably connected with the output element 14 of the torque converter 3. The input member 18 of the damper 13 comprises two axially spaced apart substantially washer-like or disc-shaped annular portions 19, 20 which are non-rotatably connected to each other radially outwardly of the flange-like output member 17. The latter is disposed between the portions 19 and 20 of the input member 18, again as seen in the direction of the common axis X—X of the rotary constituents of the torque converter 3.

The damper 13 further comprises energy storing means 13a, e.g., in the form of an annular array of coil springs, and the input and output members 18, 17 are provided with means for engaging the coil springs of the damper. Such engaging means can include windows in the output member 17 and windows or recesses in the portion 19 and/or 20 of the input member 18.

The connection between the portions 19, 20 of the input member 18 radially outwardly of the output member 17 includes plugs 21 which can constitute lugs of one piece with the portion 20 and extending in at least substantial parallelism with the axis X—X into complementary sockets or recesses of the portion 19. Portions of the plugs 21 can be deformed to establish a reliable connection between the portions 19 and 20 of the input member 18.

The portion 19 of the input member 18 is non-rotatably secured to the turbine 10 by a form-locking connector 22 which is configurated and mounted in such a way that the turbine and the input member 18 can move relative to each other in the direction of the axis X—X. The connector 22 of FIG. 1 comprises an internal gear 23 which is affixed to or forms part of the radially inner part of the portion 19 and an external gear 24 provided on or forming part of a radially inner portion or hub 25 of the turbine 10. The gears 23, 24 cooperate to hold the turbine 10 and the input member 18 against rotation relative to each other but do not interfere with axial movements of the turbine 10 relative to the input member 18 and/or vice versa. The radially inner portion or hub 25 of the turbine 10 in the torque converter 3 of FIG. 1 is a separately produced part which is welded and/or otherwise non-rotatably affixed to a shell 26 of the turbine.

In accordance with a feature of the invention, the torque transmitting apparatus 1 further comprises a form-locking connection 27 which is provided between the turbine 10 and the output element 14 and permits at least limited angular movements of the parts 10, 14 relative to each other. The details of the connection 27 are shown in FIG. 2. Such connection includes external teeth 28 provided on the output element 14 and extending with a predetermined clearance or play (shown at 30) into tooth spaces between the internal teeth 29 of the turbine 10. The mating teeth 28, 29 of the connector 27 permit axial movements of the turbine 10 and the output element 14 relative to each other. In this respect, the connection 27 is analogous to the connector 22 whose gears 23, 24 permit axial movements of the hub 25 of the turbine 10 and of the portion 19 of the input member 18 relative to each other. Such construction simplifies the assembly of the connector 22 and of the form-locking connection 27.

As can be seen in FIG. 2, the external teeth 28 can be machined into or otherwise formed in the external surface of the output element 14, and the internal teeth 29 can be machined into or otherwise formed in the hub 25 of the the turbine 10. The extent to which the output element 14 and the turbine 10 are movable relative to each other in the direction of the axis X—X is or can be limited. The clearances 30 between the mating teeth 28 and 29 permit the turbine 10 or the input element 14 to turn relative to the other of these parts at least in one direction. However, it is also possible, and often advisable, to select the clearances in such a way that the turbine 10 can turn relative to the output element 14 in a clockwise direction or in a counterclockwise direction and/or that the output element can turn relative to the turbine in each such direction. Such rotation in one direction will take place when the engine of a motor vehicle embodying the torque transmitting apparatus 1 is coasting, and the rotation will take place in the other direction when the engine is caused to pull a load. The extent to which the connection 27 or an analogous form-locking connection permits the turbine 10 and the output element 14 to turn relative to each other in one direction can be different from the extent to which such parts can turn relative to each other in the opposite direction.

The damper 13 is installed between the radially extending wall 9 of the housing section 4 and the annular piston 31 of the lockup clutch 15. The piston 31 can be made of metallic sheet material and is mounted in the chamber 12 for movement between a plurality of different positions as seen in the direction of the axis X—X. The radially outer portion of the piston 31 is provided with a friction lining 32 having an exposed friction face which contacts a complementary friction face 33 at the inner side of the wall 9 when the lockup clutch 15 is at least partially engaged. The piston 31 is centered by and is movable relative to the hub 25 of the turbine 10 in the direction of the axis X—X. To this end, the radially inner portion of the piston 31 includes or constitutes a relatively short sleeve or cylinder 34. A suitable sealing element (e.g., an O-ring) is installed between the internal surface of the sleeve 34 and the external surface of the hub 25 to prevent uncontrolled flow of hydraulic fluid between a first compartment 45 of the chamber 12 and a second compartment 45a which receives the vanes 8 of the pump 7. The piston 31 abuts the turbine 10, at least when the lockup clutch 15 is disengaged. In the apparatus 1 of FIG. 1, the sleeve 34 of the piston 31 then abuts a tolerance-compensating ring 35 which, in turn, abuts a radially extending portion 36 of the hub 25. The ring 35 renders it possible to determine the extent of movement of the piston 31 from the position of contact of its friction lining 32 with the friction face 33 toward the hub 25 with a very high degree of accuracy.

The piston 31 is non-rotatably connected with the input member 18 of the damper 13 but has limited freedom of axial movement relative to the portions 19, 20 of the input member. This is accomplished by the provision of a plug-in connection 37 between the piston 31 and the portion 19 of the input member 18. The illustrated connection comprises plugs 38 which are affixed to the piston 31 and extend, preferably with no play at all or with minimal play, into compementary holes, recesses or like female detents 39 in the portion 19 of the input member 18. However, it is equally possible to replace the illustrated connection 37 with a set of leaf springs operating between the axially movable pressure plate and the axially fixed cover or housing of a friction clutch of the type often utilized in the power trains of motor vehicles. The leaf springs permit the piston 31 to move in the direction of the axis X—X with respect to the input member 18. Reference may be had, for example, to commonly owned U.S. Pat. No. 5,180,335 granted Jan. 19, 1993 to Paul Maucher et al. for "Torsion damping assembly for use with clutches in motor vehicles". The disclosure of this patent is incorporated herein by reference.

The torque transmitting apparatus 1 further comprises resilient means 40 (e.g., a diaphragm spring) which operates between the portion 19 of the input member 18 of the damper 13 and the piston 31 to bias the piston away from the portion 19, i.e., toward an axial position corresponding to the disengaged condition of the lockup clutch 15. The resilient means 40 operates in the direction of the axis X—X and urges the piston 31 toward the turbine 10; at the same time, such resilient means urges the input member 18 and the output member 17 of the damper 13 in a direction away from the turbine 10, i.e., axially and toward the wall 9 of the housing section 4. This, in turn, ensures that all parts of the damper 13 are maintained in predetermined axial positions relative to the section 4 of the housing 2. As can be seen in FIG. 1, the radially inner part 41 of the flange-like output member 17 of the damper 13 bears directly against the adjacent radially inner portion 42 of the wall 9. If desired, the apparatus 1 can be provided with one or more friction rings or slip rings or one or more bearings (not shown) which are installed between the part 41 and the portion 42.

A radially outer portion of the output member 17 is in frictional engagement with the portion 19 of the input member 18 (as at 43) to establish a frictional hysteresis in parallel with that generated by the energy storing means 13a when the input and output members 18, 17 of the damper 13 are caused to turn relative to each other. It is equally possible to provide a friction lining or slip ring at the locus 43, i.e., in the region of contact between the output member 17 and the portion 19 of the input member 18.

The wall 9 of the housing section 4 is provided with an annular recess 44 which extends toward the prime mover (not shown but being assumed to be located to the left of the housing section 4, as viewed in FIG. 1) and provides room for the energy storing means 13a as well as for those parts of the damper 13 which are adjacent the energy storing means. The recess 44 can be sufficiently deep to accommodate at least a major part of the energy storing means 13a.

The aforementioned compartment 45 is disposed between the radially extending wall 9 of the housing section 4 and the piston 31 of the lockup clutch 15. This compartment can receive pressurized fluid (such as oil) by way of one or more conduits (not shown) discharging into the radially inner portion of the compartment. As the pressure of fluid in the compartment 45 increases, the piston 31 is caused to move axially and away from the friction face 33 of the wall 9 so that the lockup clutch 15 is disengaged. The fluid pressure in the compartment 45 can also be regulated for the purpose of selecting the extent of slip between the friction lining 32 of the piston 31 and the friction face 33 on the wall 9. In other words, the pressure of fluid in the compartment 45 can be varied for the purpose of selecting the exact condition of the lockup clutch 15 and more specifically the magnitude of torque which the lockup clutch can transmit from the housing 2 of the torque converter 3 directly to the input member 18 of the damper 13.

When the vehicle embodying the torque transmitting apparatus 1 is coasting, (i.e., when the RPM of the turbine 10 exceeds the RPM of the pump 7 and housing 2), the pressure of fluid in the annular second compartment 45a of the chamber 12 exceeds the pressure in the compartment 45 so that the turbine 10 is urged axially toward the piston 31. In the apparatus 1 of FIG. 1, the shell 26 of the turbine 10 then abuts directly against the piston 31, as at 46, so that (and assuming that the lockup clutch 15 is engaged) the friction lining 32 of the piston 31 is urged into more pronounced engagement with the friction face 33 of the wall 9. It will be seen that, when the vehicle is coasting, the piston 31 of the lockup clutch 15 can take up axial stresses which are being applied to the turbine 10. This renders it possible to dispense with means for establishing an abutment against axial movement of the hub 25 of the turbine 10 beyond a predetermined axial position relative to the wall 9.

FIG. 1 shows that the locus 46 of contact between the piston 31 and the turbine 10 is located substantially midway between the radially inner and radially outer portions of the shell 26. However, it is equally possible to transfer the locus 46 of contact further away from the axis X—X so that the piston 31 can be contacted by the radially outer portion of the shell 26. The illustrated locus 46 of contact is established due to the provision of a circumferentially complete or interrupted annular rib on a selected portion of the piston 31 radially inwardly of the friction lining 32. In addition to constituting an abutment for the adjacent (normally median or substantially median) portion of the shell 26, the rib at the locus 46 can further serve as a means for stiffening the piston, i.e., for reducing the likelihood of deformation of the piston in the direction of the axis X—X. Irrespective of its exact location, it is normally preferred to select the position of the rib at 46 in such a way that it is located opposite the blades or vanes 10a of the turbine 10.

When the lockup clutch 15 is disengaged or is operated with slip, and when the vehicle is in the process of pulling a load, the turbine 10 is driven by the housing 2 by way of the pump 7. At such time, the pressure differential between the bodies of fluid in the compartments 45 and 45a of the internal chamber 12 of the housing 2 is such that the turbine 10 is urged in the direction of the axis X—X toward the pump 7. The turbine 10 then abuts the stator 11 of the torque converter 3, and the stator 11 then bears against a thrust bearing 47 which is adjacent the inner side of the radially innermost portion of the housing section 5. A freewheel 48 enables the stator 11 to rotate in one direction about the axis X—X.

The torque transmitting apparatus 101 of FIG. 3 includes a number of constituents which are either identical with or similar or clearly analogous to the corresponding constituents of the torque transmitting apparatus 1. Those constituents of the apparatus 101 which are identical with or clearly analogous to the corresponding constituents of the apparatus 1 of FIG. 1 are denoted by similar reference characters plus 100. The apparatus 101 also comprises a fluid-operated clutch 103 which constitutes a hydrokinetic torque converter and includes a housing 102. The construction and mounting of the pump 107 and the stator 111 of the torque converter 103 are or can be the same as described in connection with the corresponding parts 7 and 11 in the torque converter 3 of FIG. 1.

The turbine 110 is connected with a hub-shaped output element 114 of the torque converter 103 by a form-locking connection 127 which is designed to permit limited angular movements of the turbine and the output element relative to each other. The connection 127 comprises external teeth 128 provided at the exterior of the output element 114 and mating with internal teeth 129 carried by the adjacent portion of the turbine 110. The teeth 129 are of one piece with a hub 125 which is a separately produced part of the turbine 110 and the radially outer portion of which is connected to the shell 126 of the turbine by rivets or in any other suitable way. However, it is equally possible to replace the hub 125 with a radially inwardly extending portion of the shell 126, and such radially inwardly extending portion of the shell 126 is then provided with internal teeth 129 mating with the external teeth 128 of the output element 114. The internal teeth of the shell 126 can constitute suitably deformed portions of the radially innermost part of such shell. The shell 126 is or can be made of metallic sheet material; if the internal teeth 129 are of one piece with such shell, the radially innermost portion of the shell can be made thicker than the radially outer portion in order to ensure the making of teeth 129 which are capable of cooperating with the teeth 128 to reliably limit the extent of angular movability of the turbine 110 and the output element 114 relative to each other.

The extent of movability of the turbine 110 in a direction axially and away from the radially extending wall 109 of the housing section 104 is limited by the stator 111 which can be caused to abut a thrust bearing 147 at the inner side of the radially innermost portion of the housing section 105.

The torque transmitting apparatus 101 further comprises a torque transmitting torsional vibrations compensating damper 113 which operates between the turbine 110 and the output element 114 and is installed between the turbine and the piston 131 of the lockup clutch or bypass clutch 115 (as seen in the direction of the common axis of the housing 102, pump 107 and turbine 110). The piston 131 and the wall 109 of the housing section 104 define a fluid-filled compartment 145 forming part of the internal chamber 112 of the housing 102. The pressure of fluid (such as oil known as ATF= automatic transmission fluid) in the compartment 145 can be regulated in order to engage the lockup clutch, to disengage the lockup clutch or to cause this clutch to operate with a selected amount of slip. The radially inner portion of the piston 131 is centered by and can perform limited axial movements relative to the output element 114 of the torque converter 103. Such radially inner portion of the piston 131 includes or constitutes a relatively short sleeve or cylinder 134 and surrounds a sealing element 134a (e.g., an O-ring) which is recessed into a circumferentially complete groove provided therefor in the peripheral surface of the output element 114. The purpose of the sealing element 134a is to prevent the flow of fluid between the compartment 145 and the other annular compartment 145a of the chamber 112 which is defined by the housing 102 and confines the turbine 110, the stator 111, the vanes of the pump 107, the damper 113 and the lockup clutch 115.

The piston 131 is non-rotatably connected with but has at least limited freedom of axial movement relative to the input member 118 of the damper 113. A plug-in type connection 137 is provided to hold the piston 131 against rotation relative to the input member 118, and such connection is located radially outwardly of the friction lining on the piston 131.

The input member 118 of the damper 113 comprises two coaxial substantially disc-shaped or washer-like annular portions 119, 120 which are fixedly secured to each other by rivets 119a located radially inwardly of the friction lining on the piston 131. The radially inner parts of the portions 119, 120 of the input member 118 are spaced apart from each other in the axial direction of the torque converter 103 and define an annular space for the substantially flange-like output member 117 of the damper 113. The output member 117 is riveted to the output element 114 and the damper 113 further comprises energy storing means 113a (e.g., an annular array of coil springs) which operate between the output member 117 and the portions 119, 120 of the input member 118.

The radially outer portion of the input member 118 is fixedly connected to the shell 126 of the turbine 110 by rivets 120a which further serve to establish a rigid connection between the portions 119, 120 of the input member 118. The rivets 120a can alternate with the rivets 119a, as seen in the circumferential direction of the turbine 110.

It is presently preferred to install the rivets 120a at least substantially midway between the radially inner and the radially outer portions of the shell 126. The rivets 119a and/or 120a can be replaced with other types of fasteners and/or with welded joints without departing from the spirit of the invention.

The reference character 146 denotes in FIG. 3 a region of contact between the piston 131 and the input member 118 of the damper 113; such region of contact is located radially outwardly of the rivets 120a, i.e., radially outwardly of the connection between the input member 118 and the turbine 110. However, it is equally possible to select a different location for the region of contact between the piston 131 and the output member 118, namely nearer to or further away from the axis of the turbine 110. The placing of the region of contact between the piston 131 and the input member 118 (or between the piston 131 and the turbine 110) at a relatively long distance from the axis of the turbine exhibits the advantage that the piston 131 is subjected to less pronounced axial bending or flexing stresses or that such bending is reduced to zero.

The turbine 110 abuts or can abut the piston 131 when the vehicle embodying the torque transmitting apparatus 101 is coasting.

The flange-like output member 117 of the damper 113 is connected with the output element 114 at least in such a way that these parts cannot rotate relative to each other. The manner in which the springs of the energy storing means 113a of the damper are mounted between the flange-like output member 117 and the portions 119, 120 of the input member 118 is or can be the same as described with reference to the damper 13 of FIG. 1.

The freewheel 148 for the stator 111 surrounds a hollow shaft 149 which, in turn, surrounds the input element of the driven unit, not shown in FIG. 3. An annular sealing element 150 is installed in a groove provided in the external surface of the hollow shaft 149 and engages that portion of the output element 114 which is adjacent the freewheel 148. The latter includes an inner race 151 which is centered on the hollow shaft 149 as seen in the radial direction of the torque converter 101. The freewheel 148 can include a set of sprags which operate between the inner race 151 and the outer race of the freewheel. The sprags permit the outer race and the stator 111 to rotate in one direction relative to the inner race 151 and the hollow shaft 149.

The inner race 151 is non-rotatably affixed to the hollow shaft 149 and the latter can surround the input shaft of the driven unit or can constitute such input shaft or can be connected to the case of the driven unit (such as a variable-speed transmission of the type used in the power trains between the clutches and the wheels of motor vehicles). For example, the shaft 149 can be at least non-rotatably affixed to the case of a variable-speed transmission.

The sealing elements 134a and 150 are located at the same radial distance (or at least close to the same radial distance) from the axis of the turbine 110. Such positioning and dimensioning of the sealing elements ensures that the fluid which fills the chamber 112 of the housing 102 exerts no axial force (or only a negligible axial force) upon the output element 114 of the torque converter 103. In other words, the output element 114 cannot act as a piston and, therefore, it is not necessary to provide a thrust bearing for the purpose of counteracting the axial forces generated by the output element. Another advantage of the feature that the output element 114 cannot and does not act as a piston is that the output element cannot generate so-called extraneous friction which is undesirable in many or most instances.

The just described feature that the sealing elements 134a, 150 have identical or practically identical diameters can be resorted to with the aforediscussed advantages in the torque transmitting apparatus of the present invention as well as in a number of conventional hydrokinetic torque converters wherein the turbine transmits torque to one or more driven units by way of an output element corresponding to or resembling the output element 114 of the torque converter 103. Still further, such feature can be embodied in torque converters wherein the turbine is non-rotatably connected to a hub or an analogous output element. Reference may be had, for example, to published German patent applications Nos. 42 02 810 and 42 08 905.

An important advantage of the form-locking connections 27 and 127 (which operate in parallel with the respective dampers 13 and 113) is that, due to the inability of the turbine 10 or 110 and the output element 14 or 114 to turn relative to each other beyond a limited extent, as determined by the clearances 30 between the teeth 28, 29 of the connection 27 and the teeth 128, 129 of the connection 127, the damper 13 or 113 is practically bypassed as soon as the magnitude of the torque being transmitted by the turbine 10 or 110 exceeds a predetermined value. In other words, and referring to FIG. 3, once such predetermined value of the magnitude of torque being transmitted by the turbine 110 is exceeded, the torque is no longer transmitted by the damper 113 but rather directly by the form-locking connection 127. The same applies for the turbine 10, the damper 13 and the form-locking connection 27 in the torque converter 3 of FIG. 1.

Since the magnitude of torque which must be transmitted by the dampers 13 and 113 is limited, the input and output members (18, 17 and 118, 117) of such dampers are not subjected to excessive deforming and/or other stresses. In other words, it is possible to utilize relatively simple, lightweight and inexpensive dampers which are merely called upon to transmit relatively small torques, namely those which must be transmitted by the dampers in order to compensate for eventual fluctuations of transmitted torque.

The apparatus 1 or 101 must transmit large torques when the respective lockup clutches 15, 115 are disengaged, i.e., when the turbines 10, 110 receive torque by way of the respective pumps 7, 107. At such time, the torque which is being transmitted by the pump 7 or 107 and the respective turbine 10 or 110 can be several times the torque which is being transmitted by the output component A of the prime mover.

Another advantage of the provision of the form-locking connections 27, 127 is that it is not necessary to provide specially designed means (such as abutments or the like) for limiting the extent of angular movability of the input and output members 18, 17 or 118, 117 relative to each other.

The hubs 25, 125 of the respective turbines 10, 110 and the output elements 14, 114 can be (and preferably are) made of a sintered material. This greatly reduces the cost of the making of such parts because the provision of teeth 28, 29 and/or 128, 129 involves no additional expenses, i.e., such teeth can be provided in the course of the sintering operation. In other words, it is not necessary to make the teeth 28, 29 and/or the teeth 128, 129 by removing material from metallic, plastic or other blanks.

It is also within the purview of the invention to make the components of the form-locking connection 27 and/or 127 in a suitable forging or extruding machine.

Figure 4:
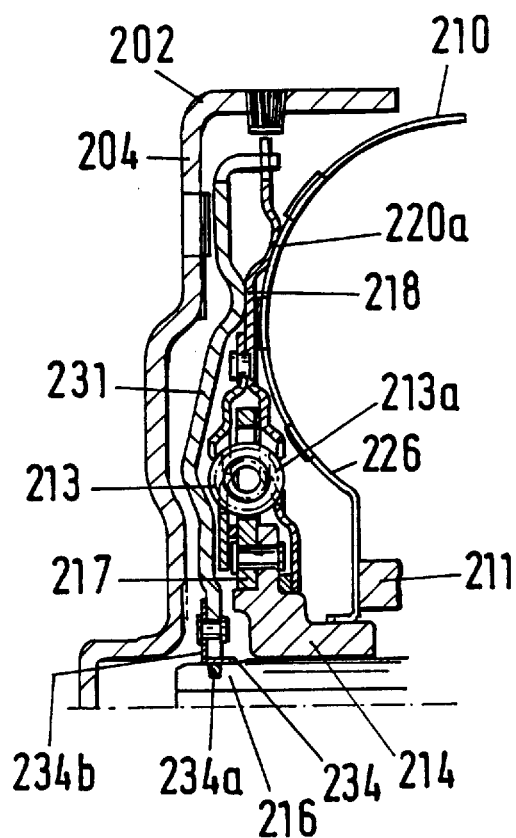
FIG. 4 is a fragmentary axial sectional view of a third apparatus.

FIG. 4 illustrates a portion of a torque transmitting apparatus wherein the piston 231 of the lockup clutch is centered by and is movable axially of an input element 216, e.g., the input shaft of a variable-speed transmission in the power train between the torque transmitting apparatus and one or more wheels of a motor vehicle. An annular sealing element 234a (e.g., an O-ring) is interposed between the radially inner portion 234 of the piston 231 and the input element 216; this sealing element prevents the flow of hydraulic fluid between the two compartments of the chamber in the housing 202 of the torque converter forming part of the torque transmitting apparatus which includes the structure of FIG. 4. The sealing element 234a ensures that the output element 214 of the torque converter is not subjected to any (or any appreciable) stresses acting in the direction of the common axis of the housing 202, turbine 210 and output element 214. Thus, the pressure of fluid or the distribution of fluid pressures at both axial ends of the output element 214 is the same or nearly the same. The reason is that the overall area of that portion of the surface of the output element 214 which is acted upon by fluid in the compartment located to the left of the element 214 (as viewed in FIG. 4) matches or at least approximates the overall area of that portion of the surface of the output element 214 which is located to the right of such element.

Figure 5:
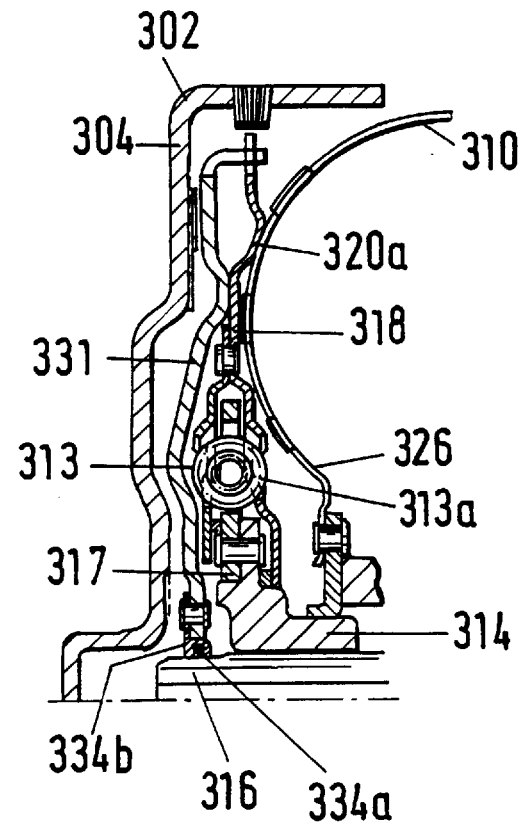
FIG. 5 is a similar fragmentary axial sectional view of an apparatus constituting a first modification of the apparatus shown in FIG. 4.

The situation is analogous in the torque transmitting apparatus of FIG. 5 which also includes a sealing element 334a installed in a separately produced radially inner portion 334b of a piston 331 forming part of the lockup clutch and being centered by and movable axially of the input element 316. The torque converter shown in FIG. 5 includes a turbine 310 having a shell 326, and a housing 302 including a section 304 connectable to the output component (such as the component A in FIG. 3) of a prime mover.

Figure 6:
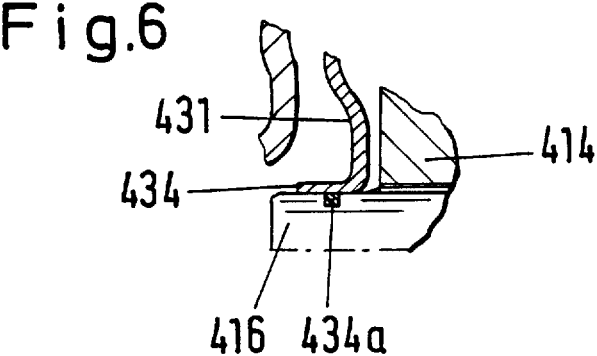
FIG. 6 is a similar fragmentary axial sectional view of an apparatus constituting a second modification of the apparatus shown in FIG. 4.

FIG. 6 shows a portion of a modified torque transmitting apparatus wherein the radially inner portion 434 of the piston 431 forming part of the lockup clutch engages an annular sealing element 434a (e.g., an O-ring) which is recessed into the peripheral surface of the input element 416 of a driven unit. The input element 416 can receive torque from an output element 414 forming part of a torque converter in the apparatus which includes the structure of FIG. 6. The output element 414 (as well as the output element 314 shown in FIG. 5) is configurated in the same way as described above in connection with the output element 214, i.e., the element 414 and/or 314 cannot change its axial position in response to the action of bodies of fluid in the two compartments of the housing forming part of the torque converter including the structure of FIG. 5 and/or FIG. 6.

The difference between the pistons 231 and 431 is that the former includes a separately produced radially inner portion 234 which surrounds the sealing element 234a whereas the radially inner portion 434 is of one piece with the major portion of the piston 431 and surrounds the sealing element 434a. The separately produced radially inner portion 234 has a substantially L-shaped cross-sectional outline and its radially outwardly extending leg 234b is riveted to the major portion of the piston 231.

The sealing element 334a of FIG. 5 is installed in a circumferentially complete groove in the internal surface of a separately produced radially inner portion 334b which is riveted to the major portion of the piston 331. The input element 316 is surrounded by and centers the radially inner portion 334b of the piston 331 and the latter has limited freedom of movement in the axial direction of the input element 316.

The turbine 210 indirectly abuts the piston 231 by way of the input member 218 of the damper 213, and the piston 231 bears against the radially extending wall of the housing section 204 when the lockup clutch is engaged to operate with or without slip. The input member 218 is welded to the shell 226 of the turbine 210 at 220a, and the damper 213 further includes an output member 217 and energy storing means 213a opposing angular movements of the input and output members 218, 217 relative to each other. The connection(s) 220a between the input member 218 of the damper 213 and the shell 226 of the turbine 210 can be established by laser welding.

The shell 326 of the turbine 310 which is shown in FIG. 5 is also welded (at 320a) to the input member 318 of the damper 313 and the latter further comprises an output member 317 as well as energy storing means 313a serving to oppose angular movements of the input and output members 318, 317 relative to each other. When the lockup clutch including the piston 331 is engaged (with or without slip), the friction lining at the radially outer portion of the piston 331 is caused to contact the adjacent friction face at the inner side of the radially extending wall forming part of the housing section 304. The housing 302 is connectable with an output component (such as the component A shown in FIG. 3) of a prime mover, e.g., a combustion engine in a motor vehicle. The connection(s) 320a can be formed by laser welding.

In the apparatus including the structure of FIG. 4, the turbine 210 can turn relative to the output element 214 until arrested by the energy storing means 213a of the damper 213. If the energy storing means 213a includes a set of arcuate coil springs, relative angular movements of the turbine 210 and the output element 214 are no longer possible when the coil springs of the energy storing means 213a have undergone a maximum amount of compression, i.e., when the neighboring convolutions of each such coil spring abut each other. The situation is the same in the apparatus embodying the structure of FIG. 5, i.e., the angular movements of the turbine 310 and the output element 314 relative to each other are brought to a halt when the coil springs of the energy storing means 313a have undergone a maximum amount of compression. Alternatively, the apparatus of FIGS. 4 and 5 can be provided with suitable abutments or stops which limit the extent of angular movability of the input and output members 218, 217 and 318, 317 (i.e., the angular movability of the turbine 210 and output element 214 or the turbine 310 and output element 314) relative to each other.

FIG. 4 shows that the shell 226 of the turbine 210 can come into abutment with the stator 211; this brings about the advantages which were pointed out in connection with the torque transmitting apparatus 101 of FIG. 3.

The apparatus which embody the structures shown in FIGS. 4, 5 and 6 can employ very simple, compact and inexpensive output elements 214, 314 and 414. Such output elements can be configured and mounted not unlike the hub of a clutch disc or clutch plate in the friction clutch of a motor vehicle. Reference may be had, for example, to FIG. 1 of the aforementioned commonly owned U.S. Pat. No. 5,180,335 to Maucher et al. Thus, all that is necessary is to provide the output element 214, 314 or 414 with internal splines which can transmit torque to the input element of a driven unit, such as a variable-speed transmission.

Figure 7:
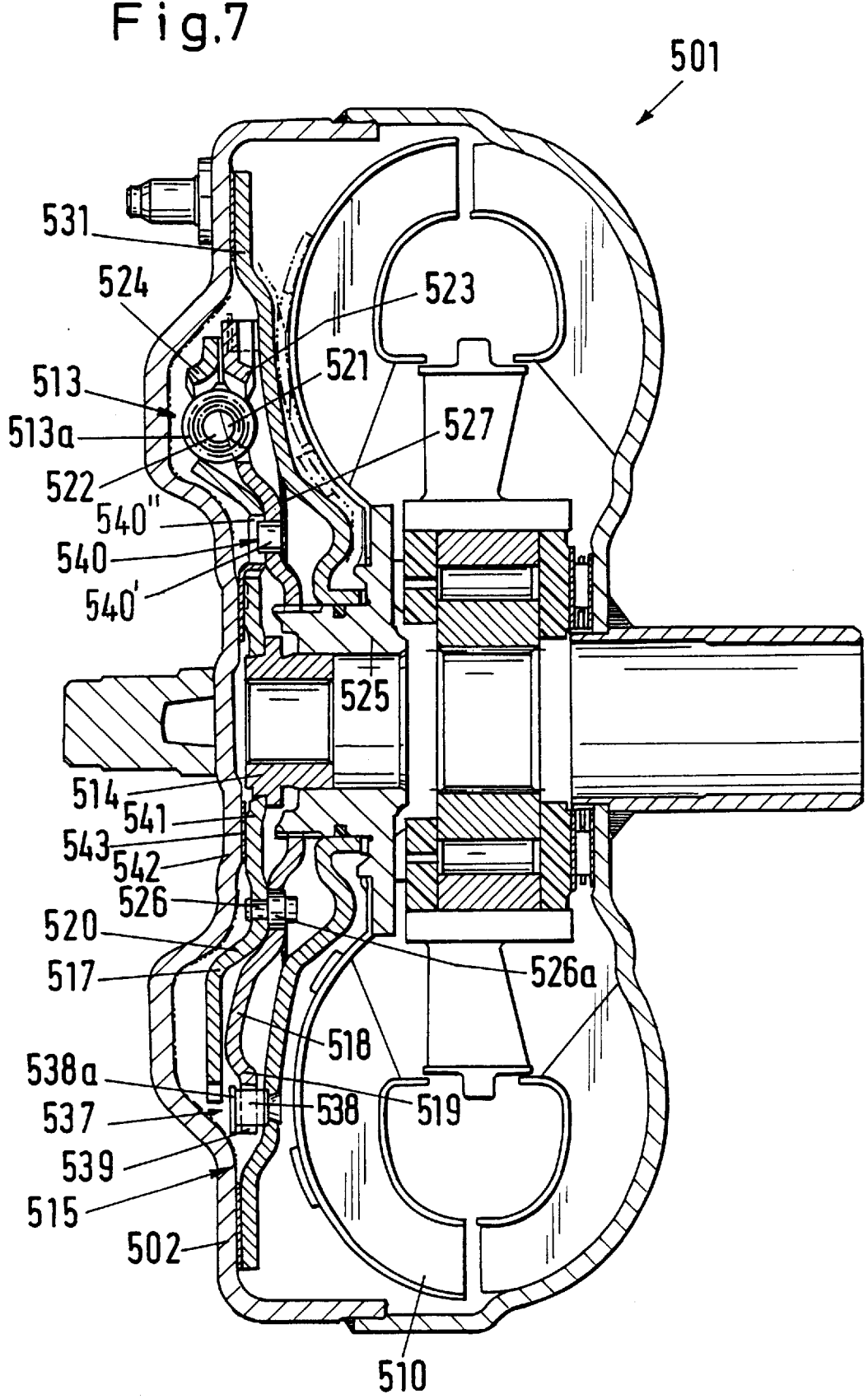
FIG. 7 is an axial sectional view of still another force or torque transmitting apparatus.

FIG. 7 illustrates a torque transmitting apparatus 501 which, in many respects, is similar to the apparatus 1 of FIG. 1. The main difference between the two apparatus is that the apparatus 501 utilizes a modified damper 513 and a modified lockup clutch or bypass clutch 515.

The turbine 510 of the fluid-operated clutch forming part of the torque transmitting apparatus 501 comprises a radially inner portion 525 which includes or constitutes a hub and is turnable, within limits, relative to the output element 514 of the fluid-operated clutch. The means for limiting the extent of angular movability of the hub 525 and output element 514 relative to each other can include a form-locking connection corresponding, for example, to the connection 27 of the type shown in FIGS. 1 and 2. However, it is equally possible to utilize any other suitable connection which determines the extent of angular movability of the hub 525 and output element 514 (i.e., of the input member 518 and the output member 517 of the damper 513) relative to each other.

The damper 513 in the apparatus 501 of FIG. 7 is even simpler than the aforedescribed dampers because the coil springs of its energy storing means 513a are confined and guided by only two parts, namely a first flange-like or washer-like portion 519 which constitutes the input member 518 and a second flange-like or washer-like portion 520 which constitutes the input member 517. The portions 519, 520 are respectively provided with windows or analogous openings 521, 522 for portions of the coil springs forming part of the energy storing means 513a, and the portions 519, 520 further include substantially wing-shaped guide portions 523, 524 which are adjacent the radially outer portions of the respective windows and extend in the circumferential direction of the portions 519, 520 to provide abutments for the radially outer portions of convolutions forming part of the adjacent coil springs. The input and output members 518, 517 of the damper 513 are adjacent each other as seen in the direction of the common axis of the turbine 510, housing 502 of the fluid-operated clutch and the output element 514. The means for coupling the input and output members 518, 517 to each other with limited freedom of angular movement includes rivets 526 which are anchored in the output member 517 and have shanks 526a extending into arcuate slots provided therefor in the output member 517. The length of the arcuate slots (as measured in the circumferential direction of the input member 518) determines the extent of angular movability of the members 517, 518 relative to each other in a first direction when the vehicle embodying the torque transmitting apparatus 501 pulls a load and in the opposite direction when the vehicle is coasting.

Those heads of the rivets 526 which are located at the right-hand side of the input member 518 (i.e., at the side facing away from the output member 517) support resilient means in the form of a membrane 527 which biases the input member 518 and the axially movable piston 531 of the lockup clutch 515 axially and away from each other. The membrane 527 can be said to constitute an annular spring which urges the input member 518 toward and against the output member 517 and which biases the piston 531 and the input member 518 (i.e., the damper 513) axially and away from each other. The function of the membrane 527 is analogous to that of the resilient means 40 in the torque transmitting apparatus 1 of FIG. 1.

A washer-like friction bearing 543 is installed between the radially inner portion 541 of the output member 517 and the radially inner portion 542 of the radially extending wall forming part of the left-hand section of the housing 502.

The piston 531 of the lockup clutch 515 is non-rotatably connected to the input member 518 of the damper 513 but has limited freedom of axial movement relative thereto. This is achieved by the provision of an axially parallel plug-in connection 537 which operates between the piston 531 and the input member 518. The illustrated connection 537 comprises projections or plugs 538 affixed to the piston 531 and extending, practically without play, into complementary holes or sockets 539 in the radially outer portion of the input member 518. The heads 538a of the plugs 538 are adjacent the left-hand side of the input member 518 and their distance from the other heads (anchored in the piston 531) determines the extent of axial movability of the piston 531 and input member 518 relative to each other.

The damper 513 and the piston 531 of the lockup clutch 515 can be assembled into a module at the manufacturing plant for convenient storage, transport to the locus of use, and installation into the torque transmitting apparatus 501, e.g., in an automobile assembly plant.

The apparatus 501 of FIG. 7 further comprises means 540 for limiting the extent of angular movability of the portions 519, 520 of the input and output members 518, 517 of the damper 513 relative to each other. Such limiting means comprises at least one abutment or stop 540' which is anchored in the portion 519 radially inwardly of the energy storing means 513*a* and extends, with requisite clearance, into a slot 540 or another suitable hole or socket in the portion 520. It is clear that the stop or stops 540' can be provided on the portion 520 and then extend into sockets in the portion 519. Still further, it is possible to provide one or more stops 540' on, and one or more sockets 540 in, each of the portions 519, 520.

If the illustrated relatively simple limiting means 540 is replaced with a limiting means including two sets of stops 540', one on the portion 519 and the other on the portion 520 (and hence also with two sets of sockets 540, one in the portion 520 and the other in the portion 519), one set of stops can be designed to limit the extent of angular movability of the portions 519, 520 relative to each other in one direction, and the other set of stops then serves to limit the extent of angular movability of the portions 519, 520 relative to each other in the opposite direction.

The stop 540' which is shown in FIG. 7 is a separately produced part which is anchored in the portion 519 of the input member 518. However, it is equally possible to provide the portion 519 and/or the portion 520 with one or more stops which constitute axially shifted parts of the material of the respective portion or which constitute tongues or lugs bent out of the general plane of the respective portion.

The limiting means 540 or its equivalent can be utilized in addition to or in lieu of a form-locking connection between the hub 525 of the turbine 510 and the output element 514. If the limiting means 540 is omitted, the form-locking connection (such as the connection 27 shown in FIGS. 1 and 2) alone ensures that the input and output members 518, 517 of the damper 513 are not subjected to pronounced stresses because the damper 513 ceases to transmit torque as soon as the form-locking connection prevents further angular displacements of the turbine 510 and the output element 514 relative to each other. Therefore, the damper 513 can employ relatively simple, lightweight and inexpensive input and output members 518, 519 which occupy a minimal amount of space in the radial and axial directions of the torque transmitting apparatus 501. The form-locking connection establishes for the power flow a path which is parallel to the path for the flow of power by way of the damper 513.

In each of the illustrated embodiments of the improved torque transmitting apparatus, the lockup clutch (such as 515) operates in series with and is located upstream or ahead of the damper (such as the damper 513) as seen in the direction of power flow from the housing (such as the left-hand section of the housing 502 shown in FIG. 7) to the output element 514. Thus, when the lockup clutch 515 is engaged, the housing 502 transmits torque to the piston 531 which transmits (at 538) torque to the input member 518 and the latter, in turn, transmits torque to the output member 517. The output member 517 transmits torque to the output element 514 of the fluid-operated clutch including the turbine 510 and the housing 502. When the lockup clutch 515 is disengaged, the input member 518 of the damper 513 receives torque from the hub 525 of the turbine 510 and the latter receives torque from the pump of the fluid-operated clutch including the turbine 510 and the housing 502.

The output member (such as 517) of the damper is non-rotatably connected with the output element (such as 514) of the fluid-operated clutch. In addition, the output member can be secured to the output element against angular and/or axial movement relative thereto. In fact, it is possible to make the output member of the damper of one piece with the output element of the fluid-operated clutch. Such design entails a pronounced simplification of the torque transmitting apparatus including a reduction of the overall number of parts, savings in space, simplicity of assembly of the damper with the fluid-operated clutch and simplicity of installation of the respective torque transmitting apparatus, e.g., in the power train between the prime mover and one or more driven units of a motor vehicle.

A comparison of the apparatus 1 of FIG. 1 with the apparatus 501 of FIG. 7 indicates that the damper can include a one-piece input member (such as 518) or a composite input member (such as 18 which includes the annular portions 19 and 20). The utilization of a one-piece input member contributes to simplicity of the damper whereas the utilization of a composite input member contributes to more reliable and more predictable confinement and guidance of the springs forming part of the energy storing means of the respective damper.

The annular bearing 543 between the adjacent radially inner portion 541 of the output member 517 of the damper 513 of FIG. 7 and the radially inner portion 542 of the radially extending wall forming part of the housing 502 constitutes a desirable but optional feature of the torque transmitting apparatus. If the bearing 543 is omitted, the radially inner portions 541 and 542 are in direct metal-to-metal contact with each other (for example, the housing 502 and the output member 517 can be made of steel). The resilient membrane 527 ensures that the radially inner portions 541, 542 are in frictional engagement with the bearing 543 or directly with each other. It is further clear that the simple friction bearing 543 can be replaced with an even simpler or with a more sophisticated thrust bearing, e.g., a bearing corresponding to the bearing 47 in the apparatus 1 of FIG. 1.

The rivet or rivets 526 permit the adjacent portions of the input and output members 518, 517 of the damper 513 of FIG. 7 to bear directly against each other under the bias of the resilient membrane 527. Thus, the members 517, 518 are maintained in frictional metal-to-metal contact with each other. Each of these members can be made of steel or another suitable metallic (or other) material. It is equally within the purview of the invention to install a friction bearing or an antifriction bearing between the neighboring portions of the input and output members 518, 517. This also holds true for the input and output members of the dampers in one or more torque transmitting apparatus which are shown in FIGS. 1–2, 3, 4, 5, 6 and 8*a*–8*c*.

The turbine 510 of FIG. 7 can but need not be in direct contact with or affixed to the piston 531 of the lockup clutch 515. The provision of an area of direct contact (such as shown at 46 in the apparatus 1 of FIG. 1) exhibits the advantage that it is no longer necessary to provide a firm abutment between the radially inner portion (such as the hub 25) of the turbine and the adjacent parts of the respective torque transmitting apparatus.

FIG. 8*a* illustrates a portion of a further force or torque transmitting apparatus 601 which includes a first hydraulic clutch 603 constituting or including a hydrokinetic torque converter and a second hydraulic clutch 615 constituting a lockup clutch or bypass clutch. The lockup clutch 615 is shown in a fully disengaged condition in that the friction face on the friction lining 632 of its axially movable piston 631 is fully disengaged from the friction face on the adjacent frustoconical portion of the left-hand section 604 forming part of a housing 602 of the torque converter 603. The torque converter 603 is ready for coasting, i.e., its pump 607 (which normally receives torque from the right-hand section 605 of the housing 602) is ready to receive torque from the turbine 610 which, in turn, then receives (or can receive) torque from the input element 616 of a driven unit such as a variable-speed transmission between the apparatus 601 and one or more wheels (not shown) of a motor vehicle. Stated otherwise, the vehicle (and hence the torque converter 603) can be said to be coasting when the RPM of the turbine 610 generally exceeds the RPM of the pump 607 (and hence the RPM of the housing 602). The two sections 604, 605 of the housing 602 are telescoped into and are welded to each other (as at 609) so that the housing defines an at least substantially fluidtight fluid-filled chamber including a compartment 640 at the left-hand side and a compartment 641 at the right-hand side of the piston 631.

The pressure of hydraulic fluid (such as oil) in the compartment 640 between the piston 631 and the radially or substantially radially extending wall of the housing section 604 exceeds the fluid pressure in the compartment 641 so that the friction face of the lining 632 on the piston is out of contact with the friction face on the adjacent portion of the section 604. Therefore, a stream of hydraulic fluid can flow from the compartment 640 into the compartment 641 in a direction as indicated by the arrow 642. Due to the hydrodynamic pressure conditions, the turbine 610 is urged in the direction of the axis X—X of the housing 602, namely in a direction from the substantially radially extending wall of the housing section 604 toward the substantially radially extending wall of the housing section 605. However, the pressure in the compartment 641 exceeds the hydrodynamic pressure acting upon the turbine 610. The resulting force urges the turbine 610 in the direction of the axis X—X and toward the pump 607. Consequently a clearance 649 (again as seen in the direction of the axis X—X) develops between the radially inner portion of the housing section 604 and the adjacent radially inner portion or hub 625 of the turbine 610. The clearance between the friction face at the inner side of the housing 604 and the friction face of the friction lining 632 on the piston 631 constitutes an extension of the clearance 649 and establishes a path for the flow of fluid between the compartments 640, 641 in a direction as indicated by the arrow 642. It will be seen that the turbine 610 and the piston 631 are acted upon by hydraulic forces to remain out of contact with the section 604 of the housing 602.

The friction lining 632 can be provided on the housing section 604, the friction lining 632 can be omitted (so that, when the lockup clutch 615 is engaged, the metallic material of the piston 631 comes in direct contact with the metallic material of the housing section 604), or a friction lining (such as 632) can be provided on the piston 631 as well as on the adjacent frustoconical portion of the housing section 604.

FIG. 8b illustrates a different condition of the force or torque transmitting apparatus 601. The torque converter 603 is ready for coasting and the lockup clutch 615 is engaged because the pressure of hydraulic fluid in the compartment 641 exceeds the fluid pressure in the compartment 640. During engagement of the clutch 615, the piston 631 moves in a direction to the left (as viewed in FIG. 8a) and expels hydraulic fluid from the compartment 640 in the direction of arrow 642a, namely radially inwardly through the narrowing clearance 649 and into an axially parallel channel or passage 672 leading to a valve 670 which serves as a means for varying the pressure in the compartments 640, 641 and is further connected to a source 671 of pressurized fluid. At such time, the valve 670 permits pressurized fluid to flow from the source 671, through an axially parallel channel or passage 673, and into the compartment 641.

In FIG. 8a, the setting of the valve 670 is such that the channel 672 admits pressurized fluid from the source 671, through the channel 672, through the clearance 649 and into the compartment 640; at the same time, the valve 670 enables the channel 673 to permit hydraulic fluid to flow from the compartment 641 back to the source 671 and/or to another destination.

Referring again to FIG. 8b, the valve 670 can further serve as a means for regulating the pressure differential between the bodies of fluid in the compartments 640 and 641 of the chamber in the housing 602 to thus determine the extent of engagement between the friction lining 632 of the piston 631 and the adjacent friction face of the housing section 604, i.e., to determine the extent of slip of the lockup clutch 615. The range of adjustability of the pressure differential between the bodies of hydraulic fluid in the compartments 640 and 641 is or can be such that the slip between the friction lining 632 and the housing section 604 can be reduced to zero; at such time, the entire torque applied to the housing section 604 by the output element of a prime mover (such as the output element A shown in FIG. 3) is being transmitted from the piston 631, through a damper 613 and to the hub 625 of the turbine 610 so that the torque converter 603 can be bypassed in its entirety.

In FIG. 8b, the turbine 610 is urged in the direction of the axis X—X and toward the substantially radial portion or wall of the housing section 604. The hub 625 then bears upon the radially inner portion of the piston 631 and the width of the clearance 649 between the radially inner portion of the piston 631 and the adjacent radially inner portion of the housing section 604 is then less than in FIG. 8a.

The torque converter 603 further comprises a stator 611 which is interposed between the turbine 610 and the pump 607 (as seen in the direction of the axis X—X). In FIG. 8b, the hydraulic fluid urges the stator 611 axially in a direction from the pump 607 toward the turbine 610 so that the radially inner portion or hub 611a of the stator abuts the hub 625 of the turbine 610 but is spaced apart from the radially inner portion of the housing section 605 (note the clearance 650 shown in the lower portion of FIG. 8b). It will be seen that, in FIG. 8b, the axial forces are taken up by mechanical means, i.e., the friction lining 632 of the piston 631 bears upon the housing section 604, the hub 625 of the turbine 610 bears against the radially inner portion of the piston 631, and the hub 611a of the stator 611 bears upon the hub 625.

The parts of the apparatus 601 can also assume the positions of FIG. 8a when the vehicle embodying such apparatus between its prime mover and one or more wheels is in the process of pulling or is ready to pull a load (while the lockup clutch 615 is disengaged because the pressure of fluid in the compartment 640 exceeds the pressure of fluid in the compartment 641 so that the friction lining 632 is spaced apart from the adjacent friction face of the housing section 604). As a rule, the RPM of the turbine 610 is less than the RPM of the pump 607 when the vehicle (i.e., the torque converter 603) is ready to pull a load. As already explained before, when the lockup clutch 615 is to be disengaged, the setting of the valve 670 is such that the channel 672 admits pressurized fluid from the source 671 into the compartment 640 wherein the fluid flows in the direction of the arrow 642 to enter the compartment 641 and to flow from the compartment 641 in the channel 673, e.g., back to the source 671.

In FIG. 8a (and assuming that the vehicle embodying the apparatus 601 is ready to pull a load), the hydrodynamic conditions in the chamber of the housing 602 are such that the turbine 610 is urged in the direction of the axis X—X and toward the pump 607. This causes the establishment of the aforediscussed clearance 649 between the hub 625 of the turbine 610 and the adjacent radially inner portion of the housing section 604 as well as of the clearance between the friction lining 632 and the adjacent portion of the section 604. At such time, the axial forces are taken up by hydraulic means.

When its parts assume the positions which are shown in FIG. 8c, the force or torque transmitting apparatus 601 enables the vehicle to pull a load and the lockup clutch 615 is at least partially engaged. The extent of slip between the friction face of the friction lining 632 on the piston 631 and the adjacent portion of the housing section 604 is determined by the pressure differential between the bodies of hydraulic fluid in the compartments 640 and 641; as mentioned above, such pressure differential can be selected, maintained and/or varied, for example, by the valve 670 which can vary the flow of fluid into and from the compartments 640 and 641. In order to engage the lockup clutch 615, the valve 670 permits pressurized fluid to flow from the source 671 into the compartment 641 by way of the channel 673, thereupon in the direction of the arrow 642a and from the compartment 640 into the channel 672. The piston 631 is urged in a direction toward the radial wall of the housing section 604 and the turbine 610 is urged axially toward the pump 607. The friction lining 632 of the piston 631 bears against the housing section 604 but the hub 625 of the turbine 610 is spaced apart from the radially inner portion of the piston 631 by a clearance 651 (as seen in the direction of the axis X—X). The width of the clearance 649 is reduced to match the width shown in FIG. 8b but not to zero. The forces acting in the direction of the axis X—X are taken up by mechanical means.

A feature of the apparatus 601 resides in that the piston 631 of the lockup clutch 615 engages the housing section 604 only by way of the friction lining 632 when the lockup clutch is at least partially engaged and the vehicle including the torque converter 603 is coasting.

The hub 625 of the turbine 610 is non-rotatably connected to the input element 616 (as already mentioned above, the element 616 can constitute the input shaft of a variable-speed transmission).

The section 604 of the housing 602 can be said to constitute an input member, and the hub 625 can be said to constitute an output member, of the force or torque transmitting apparatus 601.

The substantially toroidal radially outer portion of the turbine 610 can be caused to abut the piston 631 in the at least partially engaged or disengaged condition of the lockup clutch 615. Such toroidal portion of the turbine 610 and/or the adjacent portion of the piston 631 can be provided with one or more abutments. The abutments of the turbine 610 can contact the abutments or another portion of the piston 631 and/or vice versa. Reference may be had to the locus or loci of abutment shown at 46 in the apparatus 1 of FIGS. 1 and 2.

The damper 613 is installed between the piston 631 of the lockup clutch 615 and the hub 625 of the turbine 610 (e.g., in a manner as fully described with reference to FIGS. 1 to 7), and its energy storing elements (e.g., arcuate coil springs) act in the circumferential direction of the housing 602. It can be said that the damper 613 is interposed in a torque transmission path between the friction face of the friction lining 632 on the piston 631 and the radially inner portion or hub 625 of the turbine 610. This damper is or can be designed to damp torsional vibrations between the piston 631 of the lockup clutch 615 and the turbine 610 of the torque converter 603. The damper 613 and the turbine 610 can abut each other (in the direction of the axis X—X) in the at least partially engaged or in the at least partially disengaged condition of the lockup clutch 615. Furthermore, the hub 625 of the turbine 610 can be caused to abut the damper 613 (such as the output member 633 of the damper) when the clutch 615 is at least partially engaged or disengaged. Alternatively, the at least substantially toroidal radially outer portion of the turbine 610 can be caused to abut the damper 613 (e.g., in a manner similar to that shown in and described with reference to FIG. 4).

It is also possible to cause the piston 631 to abut a part of the damper 613 in the engaged or disengaged condition of the lockup clutch 615.

A ring-shaped or substantially ring-shaped distancing element (e.g., an element resembling the radially outer portion of the member 118 shown in FIG. 3) can be interposed between the piston 631 and the turbine 610 (as seen in the direction of the axis X—X).

As can be seen in FIG. 8c (at 651), the piston 631 can have limited freedom of axial movement relative to the turbine 610 (as seen in the direction of the axis X—X).

The force or torque transmitting apparatus 601 of FIGS. 8a to 8c constitutes an improvement over and a further development of apparatus disclosed, for example, in German Pat. No. 37 02 548. More specifically, the apparatus 601 constitutes a greatly simplified and less expensive improvement over the patented apparatus. This not only pertains to the making of the apparatus 601 but also to the simplicity and convenience of installing such apparatus in the power train of a motor vehicle.

Another important advantage of the apparatus 601 over heretofore known force or torque transmitting apparatus (e.g., those described in the aforementioned German Pat. No. 37 02 548) is that the wear upon the parts of the apparatus 601 is much less pronounced and, therefore, the useful life of the apparatus 601 is much longer. A further important advantage of the apparatus 601 is that its space requirements are a fraction of those of heretofore known apparatus; this holds particularly true as concerns the dimensions of the apparatus 601 in the direction of the axis X—X.

As already mentioned above, when the vehicle embodying the apparatus 601 is coasting or is ready to coast, the lockup clutch 615 can be engaged in such a way that the piston 631 of the lockup clutch engages the housing section 604 only and alone in the region of its friction lining 632. Since the friction lining 632 is evidently spaced apart from the housing section 604 when the lockup clutch 615 is disengaged, this means that only the friction lining 632 can contact the housing 602 in the fully or partially engaged condition of the lockup clutch irrespective of whether the vehicle is ready to coast or to pull a load. The axial forces acting at least upon the turbine 610 can be opposed by mechanical means or hydraulically.

The stator 611 constitutes an optional but often highly desirable and advantageous feature of the torque converter 603. If the latter is equipped with a stator 611 and the hub 611a of such stator is movable in the direction of the axis X—X, it is possible to maintain (at all times) an axial clearance between the hub 625 of the turbine and the housing 602, i.e., it is not necessary to install one or more thrust bearings to act between the hub 625 and the section 604 and/or 605 of the housing 602.

The piston 631 can serve as a means for transmitting to the housing section 604 any and all forces acting in the direction of the axis X—X, for example, all axially oriented forces which are being transmitted by the stator 611 and/or by the turbine 610 during coasting of the vehicle embodying the apparatus 601. This also applies for those axially oriented forces which are being transmitted by the turbine 610 while the vehicle is coasting and the lockup clutch 615 is engaged, either entirely or with slip. When the clutch 615 is disengaged, such axially oriented forces are taken up by hydraulic means.

Furthermore, and as already pointed out hereinbefore, it is often advisable to design the apparatus 601 in such a way that the axially oriented forces are opposed (at least in one of the engaged and disengaged conditions of the lockup clutch 615) by the hub 625 which is engaged by the hub 611a of the stator 611, that the hub 625 or the toroidal portion of the turbine 610 abuts the piston 631, and that the piston abuts the housing section 604 only in the region of the friction lining 632.

Another advantage of the apparatus 601 is that it renders it possible to oppose axially acting coasting forces by hydraulic means while the lockup clutch 615 is at least partially engaged or disengaged as well as to oppose by hydraulic means the axially oriented forces while the vehicle is coasting and while the lockup clutch 615 is disengaged.

When the vehicle is coasting and the lockup clutch 615 is engaged, the clutch 615 acts not unlike a thrust bearing which is interposed between the hub 625 of the turbine 610 and the housing 602. The axially oriented forces which act upon the stator 611 under the just outlined circumstances are applied to the hub 625 of the turbine 610 whereas the hub 625 and/or another part of the turbine 610 bears upon the piston 631 which, in turn, bears upon the section 604 of the housing 602. At such time, the piston 631 can take up axial forces which are being transmitted by the radially inner portion (such as the hub 625) or by the normally substantially toroidal radially outer portion of the turbine 610.

The damper 613 can be designed to constitute a means for damping undesirable movements of the turbine 610.

The housing 602 can be assembled of more than two sections, and such sections can be welded and/or otherwise reliably and sealingly secured to each other.

The part which is denoted by the character 671 can constitute the aforementioned source of hydraulic fluid (such as ATF) or it can constitute or include automatic control means for the valve 670. The latter can include a set of two or more valves.

The lockup clutch 615 is installed between the turbine 610 and the radial wall of the housing section 604 (as seen in the direction of the axis X—X). The piston 631 has an at least substantially circular outline and constitutes or forms part of the input member of the damper 613. The output member 633 of the damper 613 has internal teeth mating with external teeth on the adjacent portion of the hub 625, i.e., of the damper 610. The mating internal and external teeth ensure that the turbine 610 and the member 633 are held against any (or any appreciable) rotation relative to each other. However, it is within the purview of the invention to mount the member 633 on the turbine 610 with a certain amount of play in the circumferential direction. As already mentioned above, the piston 631 has some freedom of axial movement relative to the turbine 610. No thrust bearing is needed between the hub 625 and the section 604 and/or 605 of the housing 602.

The aforementioned ring-shaped distancing element between the turbine 610 and the piston 631 can constitute or form part of or include a diaphragm spring or a lamella which can be affixed to the piston 631 and/or to the turbine 610 and bears against the turbine 610 or against the piston 631.

The features that the piston 631 is movable (in the direction of the axis X—X) relative to the turbine 610 or, more specifically, relative to the hub 625 of the turbine, as well as that the piston 631 Is at least substantially non-rotatably coupled to the turbine 610 (such as to the hub 625 of the turbine) consitute additional novel and unobvious improvements over the proposals of prior art.

The improved force or torque transmissing apparatus is susceptible of numerous additional modifications without departing from the spirit of the present invention. Thus, it is possible to combine certain features of the apparatus 1 of FIGS. 1–2 with the features of the apparatus shown in FIGS. 3, 4, 5, 6, 7 and/or 8a–8c. For example, the feature (shown in FIGS. 4 and 5) that the shell of the turbine can be moved into direct abutment with the stator of the fluid-operated clutch can be resorted to with equal advantage in one or more other embodiments of the improved force or torque transmitting apparatus. As can be seen in FIG. 4, the turbine (210) need not be provided with a radially inner portion corresponding to the hub 25 of the turbine 10 shown in FIG. 1. Moreover, the radially inner portion of the shell 226 of the turbine 210 is centered directly on the output element 214 which also contributes to compactness, simplicity and lower cost of the improved apparatus. Angular movements of the turbine 210 relative to the output element 214 are opposed by the damper 213. As already explained with reference to FIGS. 4 and 5, the shell (226, 326) of the turbine (210, 310) can be welded (at 220a, 320a) or otherwise fixedly secured to the input member (218, 318) of the damper (213, 313). Such welded or analogous fixed connections can be replaced with connections which merely compel the turbine and the input member of the damper to share all of their angular movements.

At least certain constituents or certain combinations of two or more constituents of the improved apparatus are believed to constitute features which are novel and patentable per se. For example, the feature that the piston of the lockup clutch can be centered directly by and can sealingly engage the input element of the driven unit (as shown in FIGS. 4, 5 and 6) is believed to constitute a novel feature which can be utilized with advantage in the improved force or torque transmitting apparatus as well as in numerous heretofore known apparatus employing hydrokinetic torque converters in combination with lockup clutches or bypass clutches. The same is believed to hold true for the feature that the turbine of the torque converter can directly abut the piston of the lockup clutch (as at 46 in FIG. 1) and/or that the piston of the lockup clutch is propped close to its friction lining (to thus reduce the likelihood of axial deformation or excessive axial deformation of the piston). This feature, too, can be embodied in certain conventional force or torque transmitting apparatus employing a hydrokinetic torque converter and a lockup clutch.

The placing of the sealing elements 134a and 150 (as shown, for example, in FIG. 3) at or close to the same radial distance from the axis of the turbine is also believed to constitute a novel feature which is patentable per se because such positioning of the sealing elements brings about a number of important advantages which are fully described in the preceding passages of this specification.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A force transmitting apparatus comprising a first hydraulic clutch including at least one housing rotatable about a predetermined axis and connectable to an output element of a prime mover, at least one pump receiving torque from said housing, a turbine disposed in said housing, rotatable about said axis and arranged to transmit torque to and to receive torque from a rotary input element, and a stator disposed between said at least one pump and said turbine as seen in the direction of said axis, said first clutch being operative to coast when said turbine receives torque from said input element; and an at least partially engageable and disengageable hydraulic lockup clutch installed between an input member and an output member of the apparatus and including a piston movable in the direction of said axis, a first fluid-containing compartment in said housing at one side of said piston, a second fluid-containing compartment at the other side of said piston, and means for varying the pressure of fluid in said compartments so as to respectively disengage and engage the lockup clutch in response to a rise of fluid pressure in said second compartment above the pressure of fluid in the first compartment and vice versa, said turbine and said output member being jointly movable in the direction of said axis and said lockup clutch being engageable while said first clutch is coasting, said piston having a friction face and engaging said housing in the direction of said axis only by way of said friction face when said lockup clutch is at least partially engaged while said first clutch is coasting, said at least one housing including a section disposed between said piston and said output element as seen in the direction of said axis and said piston bearing against and transmitting to said section forces transmitted by at least one of said stator and said turbine while said first clutch is coasting.

2. The apparatus of claim 1, wherein said first clutch includes a hydrokinetic torque converter.

3. The apparatus of claim 1, wherein said input element includes a rotary shaft of a transmission.

4. The apparatus of claim 1, wherein said output member includes a hub of said turbine.

5. The apparatus of claim 1, wherein said turbine includes a radially inner portion abutting said piston in the direction of said axis at least while said first clutch is coasting.

6. The apparatus of claim 1, wherein said turbine includes a substantially toroidal portion which abuts said piston in the direction of said axis at least in one of said at least partially engaged and disengaged conditions of said lockup clutch.

7. The apparatus of claim 1, wherein at least one of said turbine and said piston includes at least one abutment which contacts the other of said turbine and said piston in at least one of said at least partially engaged and disengaged conditions of said lockup clutch.

8. The apparatus of claim 1, further comprising at least one damper acting in a circumferential direction of said housing and interposed in a torque transmission path between a friction face of said piston and a radially inner portion of said turbine.

9. The apparatus of claim 1, further comprising at least one damper acting in a circumferential direction of said housing and interposed between said piston and said turbine.

10. The apparatus of claim 9, wherein said at least one damper includes means for damping torsional vibrations between said piston and said turbine.

11. The apparatus of claim 1, further comprising at least one damper acting in a circumferential direction of said housing and interposed in a torque transmission path between said piston and said turbine, said damper and said turbine abutting each other in the direction of said axis in at least one of said at least partially engaged and disengaged conditions of said lockup clutch.

12. The apparatus of claim 11, wherein said turbine includes a hub forming part of said output member and arranged to abut said at least one damper.

13. The apparatus of claim 11, wherein said turbine includes a substantially toroidal portion which is arranged to abut said at least one damper.

14. The apparatus of claim 1, further comprising at least one damper acting in the circumferential direction of said housing and interposed in a torque transmission path between said piston and said turbine, said piston being arranged to abut said at least one damper in the direction of said axis in at least one of said at least partially engaged and disengaged conditions of said lockup clutch.

15. The apparatus of claim 1, further comprising at least one substantially ring-shaped distancing element between said piston and said turbine as seen in the direction of said axis.

16. The apparatus of claim 1, wherein said piston has limited freedom of movement relative to said turbine in the direction of said axis.

* * * * *